(12) United States Patent
Campbell et al.

(10) Patent No.: US 12,007,498 B2
(45) Date of Patent: Jun. 11, 2024

(54) SIGNAL PROCESSING FOR NEAR-FIELD RADAR

(71) Applicant: Waymo LLC, Mountain View, CA (US)

(72) Inventors: Timothy Campbell, Los Angeles, CA (US); Brett Coon, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 780 days.

(21) Appl. No.: 16/952,328

(22) Filed: Nov. 19, 2020

(65) Prior Publication Data

US 2021/0080539 A1    Mar. 18, 2021

Related U.S. Application Data

(63) Continuation of application No. 15/974,145, filed on May 8, 2018, now Pat. No. 10,866,305.

(60) Provisional application No. 62/611,971, filed on Dec. 29, 2017.

(51) Int. Cl.
*G01S 7/292* (2006.01)
*G01S 13/42* (2006.01)
*G01S 13/931* (2020.01)

(52) U.S. Cl.
CPC ............ *G01S 7/2923* (2013.01); *G01S 13/42* (2013.01); *G01S 13/931* (2013.01)

(58) Field of Classification Search
CPC ................... G01S 13/931; G01S 13/42; G01S 2013/93273; G01S 2013/9318; G01S 7/292; G01S 7/2923; G01S 7/2925; G01V 3/00; G01V 3/08; G01V 3/12; G01V 3/02; G01V 3/38; G01V 3/15; G01V 3/30; G01V 2003/086; G01V 2003/085
USPC ............................................ 342/70, 83, 195
See application file for complete search history.

(56) References Cited

U.S. PATENT DOCUMENTS

| 5,736,957 | A | | 4/1998 | Raney |
| 6,027,447 | A | * | 2/2000 | Li ........................ G01S 7/52049 600/447 |
| 6,239,747 | B1 | * | 5/2001 | Kaminski ............... G01S 3/023 342/368 |
| 6,297,764 | B1 | | 10/2001 | Wormington |
| 6,366,236 | B1 | | 4/2002 | Farmer |
| 6,693,580 | B1 | | 2/2004 | Wehling |

(Continued)

*Primary Examiner* — Vladimir Magloire
*Assistant Examiner* — Michael W Justice
(74) *Attorney, Agent, or Firm* — McDonnell Boehnen Hulbert & Berghoff LLP

(57) ABSTRACT

Examples relate to near-field radar filters that can enhance measurements near a radar unit. An example may involve receiving a first set of radar reflection signals at a radar unit coupled to a vehicle and determining a filter configured to offset near-field effects of radar reflection signals received at the radar unit. In some instances, the filter depends on an azimuth angle and a distance for surfaces in the environment causing the first set of radar reflection signals. The example may also involve receiving, at the radar unit, a second set of radar reflection signals and determining, using the filter, an azimuth angle and a distance for surfaces in the environment causing the second set of radar reflection signals. The vehicle may be controlled based in part on the azimuth angle and the distance for the surfaces causing the second plurality of radar reflection signals.

20 Claims, 15 Drawing Sheets

(56) References Cited

U.S. PATENT DOCUMENTS

| | | | |
|---|---|---|---|
| 7,612,707 B2* | 11/2009 | Wise | G01S 7/414 |
| | | | 342/91 |
| 7,627,253 B1 | 12/2009 | Ng | |
| 7,714,782 B2* | 5/2010 | Davis | H01Q 21/22 |
| | | | 342/99 |
| 7,865,277 B1* | 1/2011 | Larson | G05D 1/0206 |
| | | | 114/221 A |
| 7,957,858 B1* | 6/2011 | Larson | G05D 1/0206 |
| | | | 340/436 |
| 8,022,863 B1* | 9/2011 | Nuthalapati | G01S 7/32 |
| | | | 342/134 |
| 8,427,358 B1* | 4/2013 | Doerry | G01S 13/904 |
| | | | 342/25 R |
| 8,681,047 B2* | 3/2014 | Egri | H01Q 3/24 |
| | | | 342/368 |
| 9,194,947 B1* | 11/2015 | Mohamed | G01S 13/28 |
| 9,519,055 B2* | 12/2016 | Hellsten | G01S 7/025 |
| 9,612,320 B2* | 4/2017 | Morvan | G01S 7/41 |
| 9,739,881 B1* | 8/2017 | Pavek | G01S 13/865 |
| 9,778,749 B2* | 10/2017 | Poupyrev | G06F 21/316 |
| 9,983,305 B2* | 5/2018 | Pavek | G01S 13/931 |
| 10,310,063 B2* | 6/2019 | Ling | G01S 13/87 |
| 10,490,905 B2* | 11/2019 | Izadian | H01Q 21/0087 |
| 10,768,292 B2* | 9/2020 | Wang | G01S 13/343 |
| 10,775,498 B2* | 9/2020 | Vacanti | G01S 13/4472 |
| 2004/0027272 A1 | 2/2004 | Richardson | |
| 2005/0088913 A1* | 4/2005 | Lecomte | G01V 1/282 |
| | | | 367/51 |
| 2007/0285315 A1* | 12/2007 | Davis | H01Q 21/22 |
| | | | 342/377 |
| 2008/0172156 A1 | 7/2008 | Joh | |
| 2009/0085797 A1* | 4/2009 | Wise | G01S 7/414 |
| | | | 342/189 |
| 2011/0102261 A1* | 5/2011 | Egri | H01Q 1/28 |
| | | | 342/368 |
| 2013/0027240 A1 | 1/2013 | Chowdhury | |
| 2014/0172389 A1* | 6/2014 | Morvan | G06F 30/20 |
| | | | 703/2 |
| 2015/0248688 A1 | 9/2015 | Raunecker | |
| 2015/0331097 A1* | 11/2015 | Hellsten | G01S 13/02 |
| | | | 342/25 F |
| 2016/0054803 A1* | 2/2016 | Poupyrev | G06F 3/017 |
| | | | 345/156 |
| 2016/0187476 A1* | 6/2016 | Wang | G01S 13/343 |
| | | | 342/146 |
| 2016/0334511 A1* | 11/2016 | Ling | G01S 13/931 |
| 2017/0248688 A1 | 8/2017 | Campbell | |
| 2017/0299716 A1* | 10/2017 | Hellsten | G01S 7/025 |
| 2017/0315229 A1* | 11/2017 | Pavek | G01S 13/931 |
| 2018/0013208 A1* | 1/2018 | Izadian | H01Q 9/0407 |
| 2018/0254811 A1 | 9/2018 | Agrawal | |
| 2018/0259641 A1* | 9/2018 | Vacanti | G01S 13/953 |
| 2020/0150255 A1* | 5/2020 | Ling | G01S 13/87 |
| 2020/0158846 A1* | 5/2020 | Ling | G01S 13/0209 |

* cited by examiner

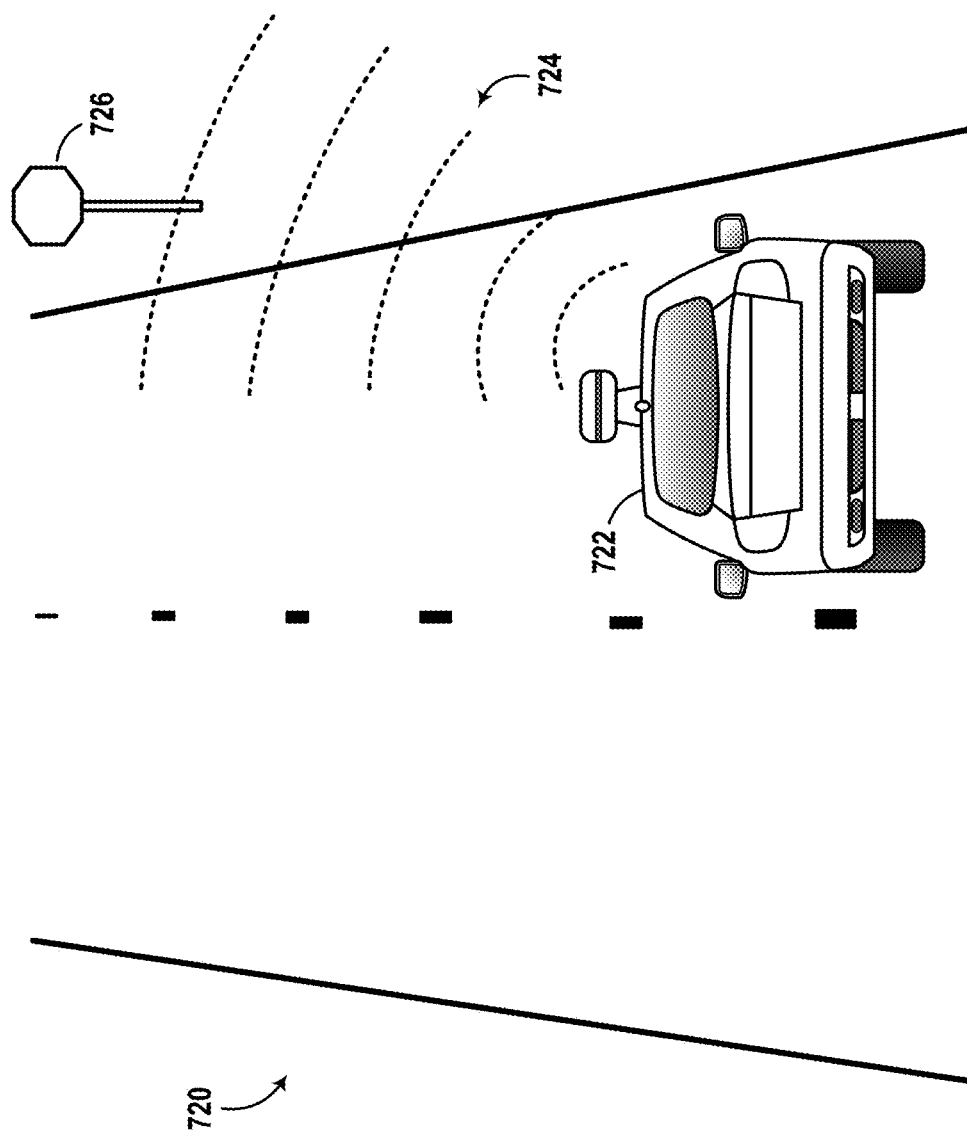

SIGNAL PROCESSING FOR NEAR-FIELD RADAR

CROSS-REFERENCE TO RELATED APPLICATION

The present application is a continuation of U.S. patent application Ser. No. 15/974,145, filed May 8, 2018, which claims priority to U.S. Provisional Patent Application No. 62/611,971, filed Dec. 29, 2017, all contents of each are herein incorporated by reference.

BACKGROUND

Radio detection and ranging (RADAR) systems can be used to actively estimate distances to environmental features by emitting radio signals and detecting returning reflected signals. Distances to radio-reflective features can be determined according to the time delay between transmission and reception. A radar system can emit a signal that varies in frequency over time, such as a signal with a time-varying frequency ramp, and then relate the difference in frequency between the emitted signal and the reflected signal to a range estimate. Some radar systems may also estimate relative motion of reflective objects based on Doppler frequency shifts in the received reflected signals.

Directional antennas can be used for the transmission and/or reception of signals to associate each range estimate with a bearing. More generally, directional antennas can also be used to focus radiated energy on a given field of view of interest. Combining the measured distances and the directional information allows for the surrounding environment features to be mapped. A radar sensor can thus be used, for instance, by an autonomous vehicle control system to avoid obstacles indicated by the sensor information.

SUMMARY

Disclosed herein are embodiments that relate to techniques for enhancing near-field radar measurements made by antenna arrays of a radar unit. A radar system may consist of one or more radar units configured with antenna arrays for measuring regions of an environment. For example, a vehicle radar system may include radar units positioned around the vehicle to capture measurements of the surrounding environment. As such, processing radar measurements obtained using antenna arrays can sometimes produce inaccurate results for an area close to the radar unit (i.e., a near-field of the radar unit). Particularly, inaccurate near-field radar measurements can result due to various factors, such as the orientation and configuration of antennas within an array on a radar unit, the curvature of incoming (or outgoing) radar signals, or other possible factors. For example, conventional radar signal processing algorithms may assume that a signal (either reflected by a surface and/or received by the radar unit) has a substantially planar wave front. However, when processing radar signals for near-field measurements of the environment, this assumption by conventional radar signal processing algorithms may not be accurate. Techniques presented herein may involve determining a filter that can enhance the accuracy of measurements in the near-field of radar unit. In some examples, the filter may factor and adjust for the curvature of the incoming and/or outgoing radar signals, the position and orientation of antenna arrays on a radar unit (and the arrangement of antennas within each array), and other possible parameters that can influence the accuracy of near-field radar measurements.

In one aspect, the present application describes a method. The method involves receiving, at a radar unit coupled to a vehicle, a first plurality of radar reflection signals, and based on the first plurality of radar reflection signals, determining, by a computing system, a filter configured to offset near-field effects of radar reflection signals received at the radar unit. In some instances, the filter depends on an azimuth angle and a distance for one or more surfaces in the environment causing the first plurality of radar reflection signals. The method may further involve receiving, at the radar unit, a second plurality of radar reflection signals and determining, by the computing system using the filter, an azimuth angle and a distance for one or more surfaces in the environment causing the second plurality of radar reflection signals. The method also includes controlling the vehicle based at least in part on the azimuth angle and the distance for the one or more surfaces causing the second plurality of radar reflection signals.

In another aspect, the present application describes a system. The system comprises a radar unit configured to receive a first plurality of radar reflection signals and a second plurality of radar reflection signals, and a processor configured to perform operations. Particularly, the processor is configured to, based on the first plurality of radar reflection signals, determine a filter configured to offset near-field effects of radar reflection signals received at the radar unit. In some instances, the filter depends on an azimuth angle and a distance for one or more surfaces in the environment causing the first plurality of radar reflection signals. The processor also is configured to determine, using the filter, an azimuth angle and a distance for one or more surfaces in the environment causing the second plurality of radar reflection signals, and provide instructions to control a vehicle based at least in part on the azimuth angle and the distance for the one or more surfaces causing the second plurality of radar reflection signals.

In yet another example, the present application describes a non-transitory computer-readable medium configured to store instructions, that when executed by a computing system comprising one or more processors, causes the computing system to perform operations. The operations include receiving, at a radar unit coupled to a vehicle, a first plurality of radar reflection signals and based on the first plurality of radar reflection signals, determining a filter configured to offset near-field effects of radar reflection signals received at the radar unit. In some instances, the filter depends on an azimuth angle and a distance for one or more surfaces in the environment causing the first plurality of radar reflection signals. The operations further include receiving, at the radar unit, a second plurality of radar reflection signals, and determining, using the filter, an azimuth angle and a distance for one or more surfaces in the environment causing the second plurality of radar reflection signals. The operations also include controlling the vehicle based at least in part on the azimuth angle and the distance for the one or more surfaces causing the second plurality of radar reflection signals.

In another aspect, the present application describes a system comprising means for receiving, at a radar unit coupled to a vehicle, a first plurality of radar reflection signals, and based on the first plurality of radar reflection signals, means for determining a filter configured to offset near-field effects of radar reflection signals received at the radar unit. In some instances, the filter depends on an azimuth angle and a distance for one or more surfaces in the environment causing the first plurality of radar reflection signals. The system may further include means for receiving, at the radar unit, a second plurality of radar reflection signals and means for determining, using the filter, an azimuth angle and a distance for one or more surfaces in the environment causing the second plurality of radar reflection signals. The system may also include means for controlling the vehicle based at least in part on the azimuth angle and the distance for the one or more surfaces causing the second plurality of radar reflection signals.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 7C illustrates a scenario involving a vehicle radar system detecting a nearby traffic sign, according to example embodiments.

DETAILED DESCRIPTION

Figure 1:
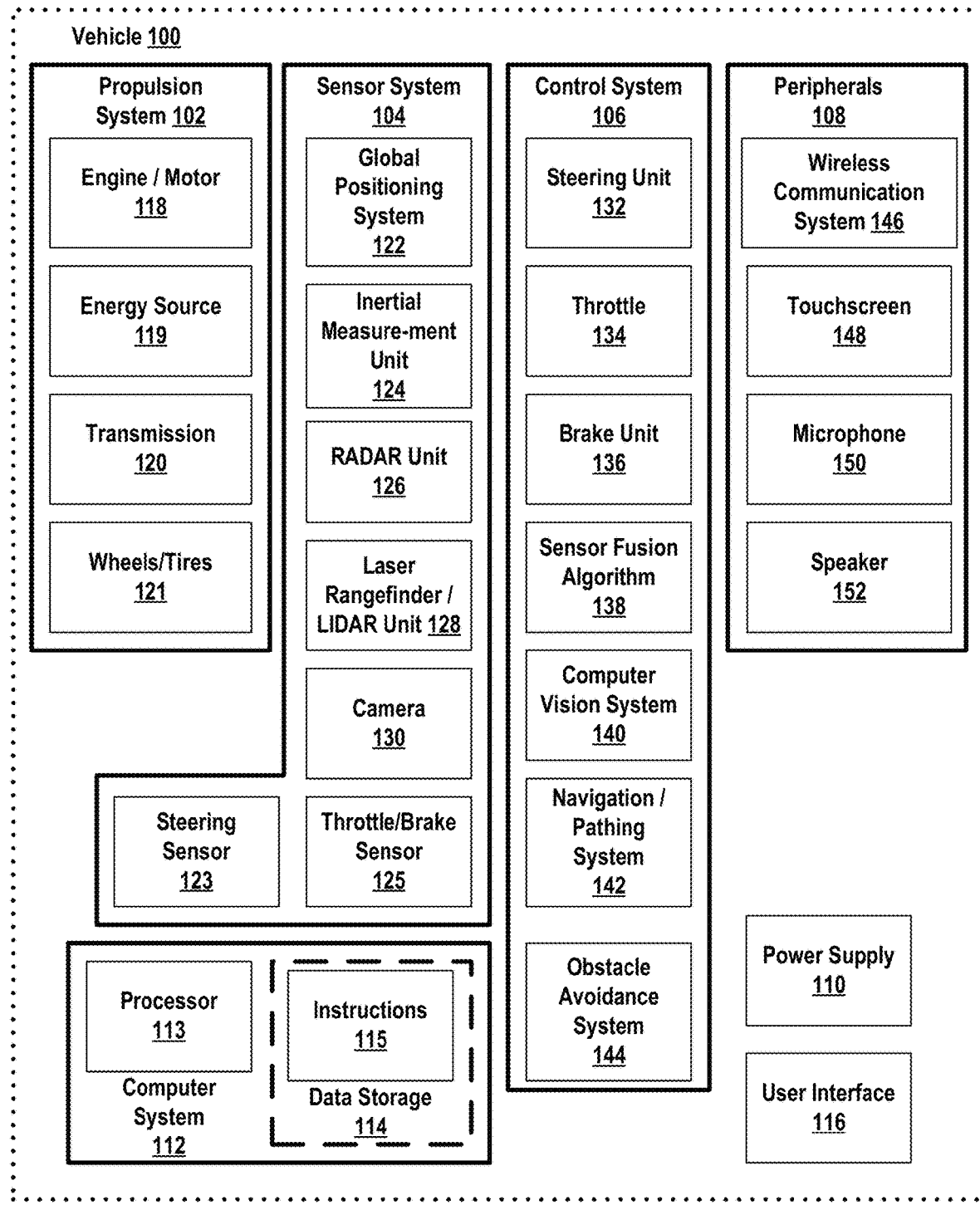
FIG. 1 is a functional block diagram illustrating a vehicle, according to example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A radar system can use transmission antennas to emit (i.e. transmit) radar signals in predetermined directions to measure aspects of an environment. Upon coming into contact with surfaces in the environment, emitted radar signals can reflect or scatter in multiple directions with some of the radar signals penetrating into surfaces to some degree. Some of the radar signals, however, may reflect off the surfaces in the environment and back towards the radar system enabling reception antennas of the radar system to capture the reflected radar signals. The received reflected signals can then be processed to determine locations of surfaces in the environment relative to the radar system. Particularly, processing the reflected signals can provide two dimensional (2D) or three dimensional (3D) measurements of the environment, including positions and orientations of various surfaces of objects and aspects of the environment.

Because a radar system can measure distances to objects and other surfaces in the environment as well as motions of moving objects, radar systems are increasingly used to assist with vehicle navigation and safety. Particularly, a vehicle radar system can enable a vehicle control system to detect and potentially identify nearby vehicles, road boundaries, weather conditions (e.g., wet or snowy roadways), traffic signs and signals, and pedestrians, among other features in the environment surrounding the vehicle. The vehicle control system can use radar measurements of the environment when determining control strategy for autonomous or semi-autonomous navigation. In addition, radar may be used in combination with other types of sensor measurements. As such, as the number of vehicle radar systems continues to grow, there is a desire for affordable radar systems that can accurately measure the surrounding environment of a vehicle.

The configuration of a radar system can differ within examples. For instance, some radar systems may consist of radar units that are each configured with one or more antennas arrays. An antenna array may involve a set of multiple connected antennas that can work together as a single antenna to transmit or receive signals. By combining multiple radiating elements (i.e., antennas), an antenna array may enhance the performance of the radar unit when compared to radar units that use non-array antennas. In particular, a higher gain and narrower beam may be achieved when a radar unit is equipped with one or more antenna arrays. As a result, a radar unit may be designed with antenna arrays in a configuration that enables the radar unit to measure particular regions of the environment, such as targeted areas positioned at different ranges (distances) from the radar unit.

Radar units configured with antenna arrays can differ in overall configuration. For instance, the number of arrays, position of arrays, orientation of arrays, and size of antenna arrays on a radar unit can vary in examples. In addition, the quantity, position, alignment, and orientation of radiating elements (antennas) within an array of a radar unit can also vary. As a result, the configuration of a radar unit may often depend on the desired performance for the radar unit. For example, the configuration of a radar unit designed to measure distances far from the radar unit (e.g., a far range of the radar unit) may differ compared to the configuration of a radar unit used to measure an area nearby the radar unit (e.g., a near field of the radar unit).

To further illustrate, in some examples, a radar unit may include the same number of transmission antenna arrays and reception antenna arrays (e.g., four arrays of transmission antennas and four arrays of reception antennas). In other examples, a radar unit may include a number of transmission antenna arrays that differs from the number of reception antenna arrays (e.g., 6 transmission antenna arrays and 3 reception antenna arrays). In addition, some radar units may operate with parasitic arrays that can control radar transmissions. Other example radar units may include one or multiple driven arrays that have radiating elements connected to an energy source, which can have less overall energy loss when compared to parasitic arrays.

Antennas on a radar unit may be arranged in one or more linear antenna arrays (i.e., antennas within an array are aligned in a straight line). For instance, a radar unit may include multiple linear antenna arrays arranged in a particular configuration (e.g., in parallel lines on the radar unit). In other examples, antennas can also be arranged in planar arrays (i.e., antennas arranged in multiple, parallel lines on a single plane). Further, some radar units can have antennas arranged in multiple planes resulting in a three dimensional array.

A radar unit may also include multiple types of arrays (e.g., a linear array on one portion and a planar array on another portion). As such, radar units configured with one or more antenna arrays can reduce the overall number of radar units a radar system may include to measure a surrounding environment. For example, a vehicle radar system may include radar units with antenna arrays that can be used to measure particular regions in an environment as desired while the vehicle navigates.

Some radar units may have different functionality and operational characteristics. For example, a radar unit may be configured for long-range operation and another radar unit may be configured for short-range operation. A radar system may use a combination of different radar units to measure different areas of the environment. Accordingly, it may be desirable for the signal processing of short-range radar units to be optimized for radar reflections in the near-field of the radar unit.

When processing reflections of radar signals transmitted and/or received using one or more antenna arrays of a radar unit, processing may produce some degree of inaccuracy for near-field measurements. For example, the degree of curvature of radar signals transmitted and/or received by one or more antenna arrays of the radar unit can impact measurements that represent an area near the radar unit (i.e., a near-field of the radar unit). To further illustrate, as transmitted radar signals travel farther from an array of transmission antennas (and the radar unit in general), the degree of curvature decreases as the distance between the transmitted radar signals and array of transmission antennas (and radar unit in general) increases (i.e. the wave front becomes more planar as the distance from transmission increases). As such, radar signals with less curvature further from the radar unit may produce more accurate measurements compared to radar signals with more curvature positioned in the near-field.

Similar to the transmitted radar signals that can have curvature near transmission arrays, reflections of radar signals received at reception arrays of a radar unit may also include a degree of curvature that can impact near-field measurement results. Particularly, as the reflections of radar signals travel closer to an array of reception antennas (and the radar unit in general), the degree of curvature increases as the distance between the reflections of radar signals and array of reception antennas (and radar unit in general) decreases (i.e. the wave front becomes more planar as the distance from reflection point increases). As a result, the increased curvature of the reflections of radar signals can impact the accuracy of measurements in the near-field of the radar unit.

Examples embodiments presented herein can enhance the near-field measurements generated using radar transmitted and received by antenna arrays of a radar unit. Particularly, a filter can be determined that can increase the accuracy of measurements in an area close to the radar unit (i.e., the near-field of the radar unit).

Precise radar measurements of the area surrounding a vehicle navigating a roadway can assist a vehicle control system (or a driver) process many situations vehicles often encounter. For example, accurate radar measurements of the area nearby the vehicle can enhance object detection as the vehicle navigates. The enhanced near-field radar measurements (e.g., ~1 to 10 meters from radar units on the vehicle) can be used to detect and potentially identify objects that enter the area in the area surrounding the vehicle, such as road boundaries (e.g., curbs, road barriers), road markings (e.g., lane reflectors, lane markings), traffic signs, parking meters, fire hydrants, pedestrians, cyclists, emergency markings, among other features. The increased accuracy can reduce potential buffers used when estimating the position and orientation of closely positioned detected surfaces measured using radar as a vehicle operates.

In addition, reducing errors associated with short range radar measurements of the environment near the vehicle radar system can help a vehicle navigate within lanes of a roadway. For instance, accurate near-field radar measurements may help a vehicle control system monitor and subsequently predict the positions of lane markers during navigation. As such, more accurate near-field radar measurements can help a vehicle navigate the various environments and situations that require precise steering and obstacle avoidance.

In some examples, enhanced radar measurements may help detect pedestrians that enter an area positioned around the vehicle. To illustrate, radar measurements near the vehicle can be used to detect the presence of a passenger such that the vehicle can prepare for boarding by the passenger (e.g., open door safely for passenger to use). In another example, a vehicle may use nearby radar measurements to detect a pedestrian approaching an intersection. For instance, the vehicle may use radar to estimate that the pedestrian may enter into a road at a cross-walk signal post.

In some examples, a filter configured to offset near field radar measurements can be determined based on parameters of radar reflection signals received at one or more reception arrays of a radar unit, such as the azimuth angle and the distance for one or more surfaces in the environment that cause the received radar reflection signals. In some instances, the filter may factor other parameters, such as the curvature of transmitted radar signals and/or the curvature of incoming radar reflection signals, the position, orientation, and dimensions of one or multiple arrays of the radar unit, among other factors.

As indicated above, a determined filter may reduce inaccuracies in measurements determined for a near-field of a radar unit that uses arrays of antennas. The near-field of a radar unit can differ within examples. For example, the near-field of a radar unit may represent an area that involves measurements up to 20 meters from the radar unit. As another example, the near-field of a different radar unit may be measurements up to 5 meters from the radar unit. Other examples of near-field dimensions for a radar unit are possible. Further, in some instances, the width of the near-field can vary depending on the beam width that the radar unit is configured to measure. For example, the range that may be considered the near-field may be proportional to a wavelength of the radar signals, an aperture size of a radar unit, and/or element spacing of an array of the radar unit.

In some examples, the distance of the near-field of the radar unit that can depend on the configuration (e.g., quantity, positions, and sizes) of the transmission antenna array(s), the reception antenna array(s), or both. For example, the near-field of a radar unit configured with 6 transmission and reception antenna arrays may differ compared to the near-field of a radar unit configured with 2 transmission and reception antenna arrays. In another example, the near-field of a radar unit may depend on the overall configuration of the radar unit. For instance, a radar unit configured with closely positioned antenna arrays may have different near-field undesired effects compared to a radar unit configured with spaced apart antenna arrays.

To further illustrate, an example for determining a filter that can increase the accuracy of measurements made for the near-field of a radar unit made using antenna arrays may initially involve receiving radar reflection signals at the radar unit. In particular, the radar unit may include one or more reception antenna arrays that receive radar reflection signals. In some examples the radar unit may be positioned on a vehicle as part of a vehicle radar system configured to help measure the environment surrounding the vehicle. As such, determining the filter may involve processing the received radar reflection signals in order to determine a filter that can offset inaccurate measurements in the near-field of the radar unit. In some instances, the determined filter may depend on an azimuth angle and a distance for each surface in the environment that reflected the radar signals back to the reception array(s) of the radar unit.

After determining the filter, the radar unit may receive more radar reflection signals and utilize the filter when processing the radar reflection signals. In particular, the filter may modify the near-field measurements in a way that increase their overall accuracy. As an example, a system may determine an azimuth angle and a distance for one or more surfaces in the environment in the near-field of the radar unit that reflected the radar signals processed using the filter.

In another example, a system may determine the filter for processing near-field radar measurements during a calibration process. For example, the system may develop the filter while navigating the vehicle on a protected or private road. The system may develop the filter while the vehicle is unoccupied. As such, once the system determine the filter is performing above a threshold level of performance, the vehicle may utilize the filter while providing transportation for passengers.

In some examples, one or multiple filters may be determined for use with radar units of a vehicle radar system. For instance, a filter may be determined for each radar unit of the vehicle radar system. As such, the vehicle control system may use the filters during processing of radar signals to enhance its understanding of near-field areas surrounding the vehicle. After one or more filters are determined to enhance the accuracy of near-field measurements, radar may be used to detect nearby objects, including road boundaries (e.g., curbs), other vehicles, pedestrians, and weather conditions of roads, as well as other features in the environment.

In a further example, a filter determined to enhance measurements made nearby the radar unit may be modified (i.e., calibrated). For instance, a system may update the filter based on indications of azimuth angles and distances for one or more surfaces in the environment as represented by new sets of received radar reflection signals. To further illustrate, a vehicle radar system may periodically update one or more filters used to enhance near-field radar measurements.

In some examples, a system may determine multiple filters that can be used to increase the accuracy of radar measurements of a near-field of a radar unit. For instance, different filters may be used depending on the direction of measurement of a particular radar unit. Other factors may influence which filter is used during processing within examples. In addition, in some examples, a system may store a filter when the radar system is powered off and subsequently use the filter for processing near-field radar measurements after the radar system is powered back on.

The following detailed description may be used with an apparatus having one or multiple antenna arrays that may take the form of a single-input single-output single-input, multiple-output (SIMO), multiple-input single-output (MISO), multiple-input multiple-output (MIMO), and/or synthetic aperture radar (SAR) radar antenna architecture.

In some embodiments, radar antenna architecture may include a plurality of "dual open-ended waveguide" (DOEWG) antennas. In some examples, the term "DOEWG" may refer to a short section of a horizontal waveguide channel plus a vertical channel that splits into two parts, where each of the two parts of the vertical channel includes an output port configured to radiate at least a portion of electromagnetic waves that enter the antenna. Additionally, a plurality of DOEWG antennas may be arranged into an antenna array.

Some example radar systems may be configured to operate at an electromagnetic wave frequency in the W-Band, for example the frequency may be 77 Gigahertz (GHz), which corresponds to a millimeter (mm) wave electromagnetic waves. These radar systems may use antennas that can focus the radiated energy into tight beams in order to enable the radar system to measure an environment with high accuracy, such as an environment around an autonomous vehicle. Such antennas may be compact (typically with rectangular form factors), efficient (i.e., with little of the 77 GHz energy lost to heat in the antenna or reflected back into the transmitter electronics), and low cost and easy to manufacture (i.e., radar systems with these antennas can be made in high volume).

Example antenna architecture may comprise multiple metal layers (e.g., aluminum plates) that can be machined with computer numerical control (CNC), aligned properly, and joined together. The first metal layer may include a first half of an input waveguide channel, where the first half of the first waveguide channel includes an input port that may be configured to receive electromagnetic waves (e.g., W-band waves) into the first waveguide channel. The first metal layer may also include a first half of a plurality of wave-dividing channels. The plurality of wave-dividing channels may comprise a network of channels that branch out from the input waveguide channel and that may be configured to receive the electromagnetic waves from the input waveguide channel, divide the electromagnetic waves into a plurality of portions of electromagnetic waves (i.e., power dividers), and propagate respective portions of electromagnetic waves to respective wave-radiating channels of a plurality of wave-radiating channels. The waveguide antenna elements and/or the waveguide output ports may be rectangular in shape, in some embodiments. In alternative embodiments, the waveguide antenna elements and/or the waveguide output ports may be circular in shape. Other shapes are also possible.

The rounded rectangular channels may serve as resonant chambers that can alter the polarization of incoming electromagnetic waves. For example, high energy leakage from one polarization to another polarization (e.g., from a horizontal $TE_{10}$ polarization to a vertical $TE_{10}$ polarization) may occur within the chamber. Unlike alternative methods of changing polarization in waveguides that make use of physical twists in a waveguide occurring over a many wavelength distance, the thickness of the polarization filter can be less than a wavelength (e.g., between a half and a whole wavelength of corresponding input electromagnetic waves) while still achieving sufficient polarization conversion. The rounded rectangular polarization-modification channels may also be designed such that evanescent waveguide modes emanating from the channel die out sufficiently quickly as they propagate away from the channel. Because of both of these factors, less energy loss may occur during the polarization conversion, resulting in increased energy efficiency when compared with alternate methods of rotating/changing polarization.

Based on the shape and the materials of the corresponding polarization-modification channels and waveguides, the distribution of propagating energy can vary at different locations within the antenna, for example. The shape and the materials of the polarization-modification channels and waveguides define the boundary conditions for the electromagnetic energy. Boundary conditions are known conditions for the electromagnetic energy at the edges of the polarization-modification channels and waveguides. For example, in a metallic waveguide, assuming the polarization-modification channel and waveguide walls are nearly perfectly conducting (i.e., the waveguide walls can be approximated as perfect electric conductors—PECs), the boundary conditions specify that there is no tangentially (i.e., in the plane of the waveguide wall) directed electric field at any of the wall sides. Once the boundary conditions are known, Maxwell's Equations can be used to determine how electromagnetic energy propagates through the polarization-modification channels and waveguides.

Maxwell's Equations may define several modes of operation for any given polarization-modification channel or waveguide. Each mode has one specific way in which electromagnetic energy can propagate through the polarization-modification channel or waveguide. Each mode has an associated cutoff frequency. A mode is not supported in a polarization-modification channel or waveguide if the electromagnetic energy has a frequency that is below the cutoff frequency. By properly selecting both (i) dimensions and (ii) frequency of operation, electromagnetic energy may propagate through the polarization-modification channels and waveguides in specific modes. The polarization-modification channels and/or the waveguides can be designed so only one propagation mode is supported at the design frequency.

There are four main types of waveguide propagation modes: Transverse Electric (TE) modes, Transverse Magnetic (TM) modes, Transverse Electromagnetic (TEM) modes, and Hybrid modes. In TE modes, the electromagnetic energy has no electric field in the direction of the electromagnetic energy propagation. In TM modes, the electromagnetic energy has no magnetic field in the direction of the electromagnetic energy propagation. In TEM modes, the electromagnetic energy has no electric or magnetic field in the direction of the electromagnetic energy propagation. In Hybrid modes, the electromagnetic energy has some of both electric field and magnetic field the direction of the electromagnetic energy propagation.

TE, TM, and TEM modes can be further specified using two suffix numbers that correspond to two directions orthogonal to the direction of propagation, such as a width direction and a height direction. A non-zero suffix number indicates the respective number of half-wavelengths of the electromagnetic energy equal to the width and height of the respective polarization-modification channel or waveguide (e.g., assuming a rectangular waveguide). However, a suffix number of zero indicates that there is no variation of the field with respect to that direction. For example, a $TE_{10}$ mode indicates the polarization-modification channel or waveguide is half-wavelength in width and there is no field variation in the height direction. Typically, when the suffix number is equal to zero, the dimension of the waveguide in the respective direction is less than one-half of a wavelength. In another example, a $TE_{21}$ mode indicates the waveguide is one wavelength in width (i.e., two half wavelengths) and one half wavelength in height.

When operating a waveguide in a TE mode, the suffix numbers also indicate the number of field-maximums along the respective direction of the waveguide. For example, a $TE_{10}$ mode indicates that the waveguide has one electric field maximum in the width direction and zero maxima in the height direction. In another example, a $TE_{21}$ mode indicates that the waveguide has two electric field maxima in the width direction and one maximum in the height direction.

Additionally or alternatively, different radar units using different polarizations may prevent interference between different radars in the radar system. For example, the radar system may be configured to interrogate (i.e., transmit and/or receive radar signals) in a direction normal to the direction of travel of an autonomous vehicle via SAR functionality. Thus, the radar system may be able to determine information about roadside objects that the vehicle passes. In some examples, this information may be two dimensional (e.g., distances various objects are from the roadside). In other examples, this information may be three dimensional (e.g., a point cloud of various portions of detected objects). Thus, the vehicle may be able to "map" the side of the road as it drives along, for example.

Some examples may involve using radar units having antenna arrays arranged in MIMO architecture. Particularly, the filter may be determined to adjust near-field measurements may by a radar unit having antenna arrays arranged in MIMO architecture. Radar signals emitted by the transmission antennas are orthogonal to each other and can be received by one or multiple corresponding reception antennas. As such, the radar system or associated signal processor can perform 2D SAR image formation along with a 3D matched filter to estimate heights for pixels in a 2D SAR map formed based on the processed radar signals.

If two autonomous vehicles are using analogous radar systems to interrogate the environment (e.g., using the SAR technique described above), it could also be useful for those autonomous vehicles to use different polarizations (e.g., orthogonal polarizations) to do the interrogation, thereby preventing interference. Additionally, a single vehicle may operate two radars units having orthogonal polarizations so that each radar unit does not interfere with the other radar unit.

Referring now to the figures, FIG. 1 is a functional block diagram illustrating example vehicle 100, which may be configured to operate fully or partially in an autonomous mode. More specifically, vehicle 100 may operate in an autonomous mode without human interaction (or reduced human interaction) through receiving control instructions from a computing system. As part of operating in the autonomous mode, vehicle 100 may use sensors to detect and possibly identify objects of the surrounding environment in order to enable safe navigation. In some implementations, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112, data storage 114, and user interface 116. In other examples, vehicle 100 may include more or less subsystems, which can each include multiple elements. The subsystems and components of vehicle 100 may be interconnected in various ways (e.g., wired or wireless connections). In addition, functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar unit 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., 02 monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects, including the speed and heading of the objects, within the local environment of vehicle 100. As such, radar unit 126 may include antennas configured to transmit and receive radar signals as discussed above. In some implementations, radar unit 126 may correspond to a mountable radar system configured to obtain measurements of the surrounding environment of vehicle 100.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

Figure 2:
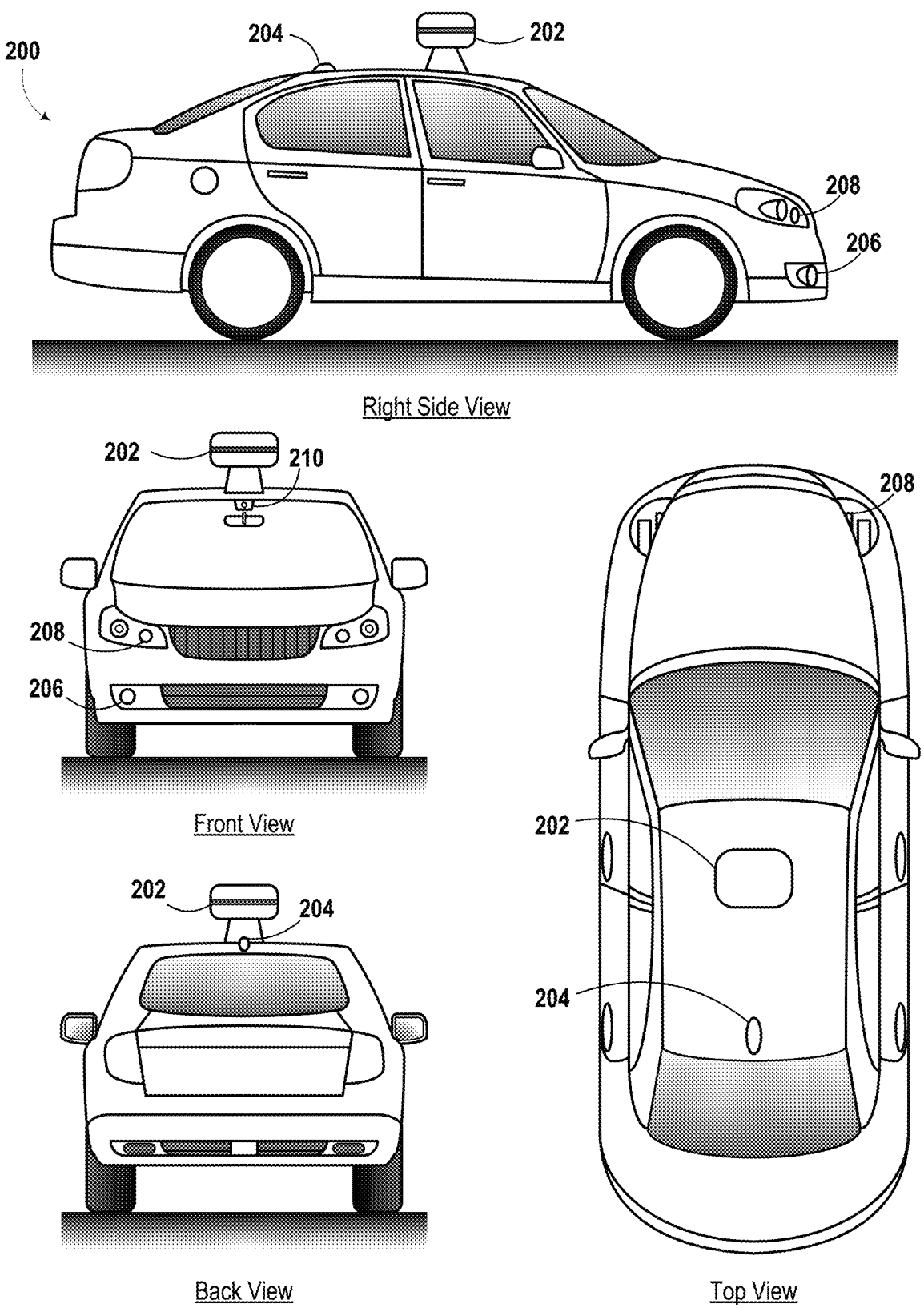
FIG. 2 illustrates a physical configuration of a vehicle, according to example embodiments.

FIG. 2 illustrates a physical configuration of vehicle 200, which may represent one possible physical configuration of vehicle 100 described in reference to FIG. 1. Depending on the embodiment, vehicle 200 may include sensor unit 202, wireless communication system 204, radio unit 206, deflectors 208, and camera 210, among other possible components. For instance, vehicle 200 may include some or all of the elements of components described in FIG. 1. Although vehicle 200 is depicted in FIG. 2 as a car, vehicle 200 can have other configurations within examples, such as a truck, a van, a semi-trailer truck, a motorcycle, a golf cart, an off-road vehicle, robotic device, or a farm vehicle, among other possible examples.

Sensor unit 202 may include one or more sensors configured to capture information of the surrounding environment of vehicle 200. For example, sensor unit 202 may include any combination of cameras, radars, LIDARs, range finders, radio devices (e.g., Bluetooth and/or 802.11), and acoustic sensors, among other possible types of sensors. In some implementations, sensor unit 202 may include one or more movable mounts operable to adjust the orientation of sensors in sensor unit 202. For example, the movable mount may include a rotating platform that can scan sensors so as to obtain information from each direction around vehicle 200. The movable mount of sensor unit 202 may also be movable in a scanning fashion within a particular range of angles and/or azimuths.

In some implementations, sensor unit 202 may include mechanical structures that enable sensor unit 202 to be mounted atop the roof of a car. Additionally, other mounting locations are possible within examples.

Wireless communication system 204 may have a location relative to vehicle 200 as depicted in FIG. 2, but can also have different locations within implementations. Wireless communication system 200 may include one or more wireless transmitters and one or more receivers that may communicate with other external or internal devices. For example, wireless communication system 204 may include one or more transceivers for communicating with a user's device, other vehicles, and roadway elements (e.g., signs, traffic signals), among other possible entities. As such, vehicle 200 may include one or more vehicular communication systems for facilitating communications, such as dedicated short-range communications (DSRC), radio frequency identification (RFID), and other proposed communication standards directed towards intelligent transport systems.

Camera 210 may have various positions relative to vehicle 200, such as a location on a front windshield of vehicle 200. As such, camera 210 may capture images of the environment of vehicle 200. As illustrated in FIG. 2, camera 210 may capture images from a forward-looking view with respect to vehicle 200, but other mounting locations (including movable mounts) and viewing angles of camera 210 are possible within implementations. In some examples, camera 210 may correspond to one or more visible light cameras. Alternatively or additionally, camera 210 may include infrared sensing capabilities. Camera 210 may also include optics that may provide an adjustable field of view.

Figure 3:
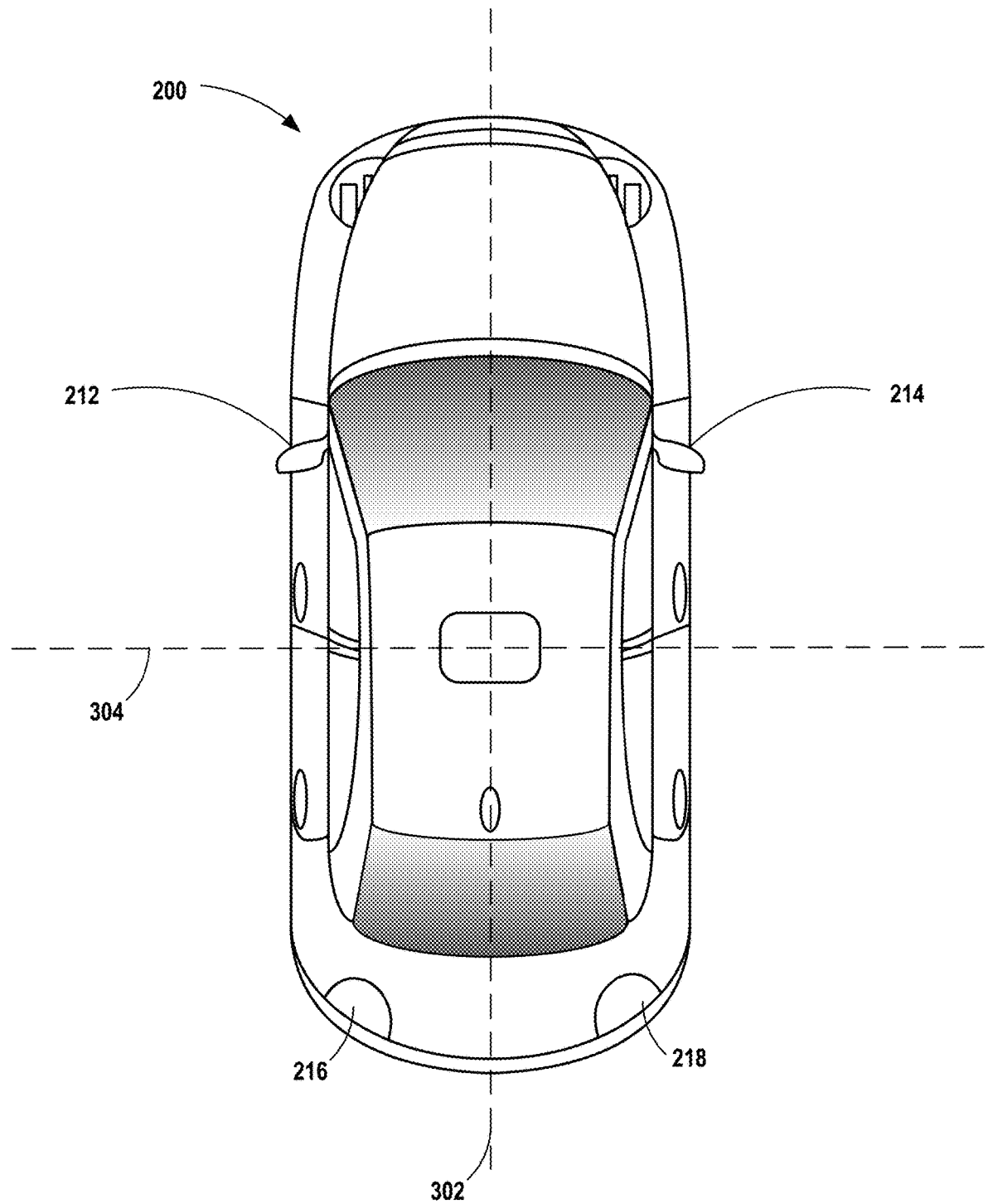
FIG. 3 illustrates a layout of radar sectors, according to example embodiments.

FIG. 3 illustrates an example layout of radar sectors for autonomous vehicle 200. As shown in FIG. 3, each of the radar sectors may have an angular width approximately equal to the scanning range of the radar units (as will be described with respect to FIG. 4). For example, the sectors of FIG. 3 divide the azimuth plane around autonomous vehicle 200 into multiple 90 degree sectors. However, in examples where the radar units are configured to scan a radar beam over a different angle than 90 degrees (not shown), the width and number of sectors may change. Although FIG. 3 shows a car, example methods and systems presented herein may be used with other vehicular systems as well, such as aircraft, boats, etc.

As shown in FIG. 3, the radar sectors may align with the axes (302 and 304) of vehicle 200. For example, there may be a front left, front right, rear left, and rear right sector defined by the midpoints of vehicle 200. Because each sector corresponds to one radar unit, each radar unit may be configured to scan across one sector. Further, because each example radar unit of FIG. 3 has a scanning angle of approximately 90 degrees, each radar unit scans a region that approximately does not overlap with the scanning angle of any other radar unit. The layout of radar sectors shown in FIG. 3 is one example. Other possible layouts of radar sectors are possible as well.

In order to achieve radar sectors defined by the midpoints of vehicle 200, each radar unit may be mounted at a 45-degree angle with respect to the two axes of vehicle 200. By mounting each radar unit a 45 degree angle with respect to the two axes of vehicle 200, a 90 degree scan of the radar unit would scan from one vehicle axis to the other vehicle axis. For example, a radar unit mounted at a 45-degree angle to the axes in side mirror unit 212 may be able to scan the front left sector (i.e. from vertical axis 302 through the front of vehicle 200 to horizontal axis 304 that runs through the side of the vehicle).

An additional radar unit may be mounted at a 45-degree angle to the axes in side mirror unit 214 may be able to scan the front right sector. In order to scan the back right sector, a radar unit may be mounted in taillight unit 218. Additionally, in order to scan the back left sector, a radar unit may be mounted in taillight unit 216. The radar unit placements shown in FIG. 3 are merely to illustrate one possible example.

In various other examples, the radar units may be placed in other locations, such as on top or along other portions of the vehicle, or within or behind other vehicle components. Further, the sectors may also be defined differently in various embodiments. For example, the sectors may be at a 45-degree angle with respect to the vehicle. In this example, one radar unit may face forward, another backward, and the other two to the sides of the vehicle.

In some examples, all the radar units of vehicle 200 may be configured with the same scanning angle. The azimuth plane around the vehicle is equal to a full 360 degrees. Thus, if each radar unit is configured with the same scanning angle, then the scanning angle for the radar units would be equal to approximately 360 divided by the number of radar units on the vehicle. Thus, for full azimuth plane scanning, vehicle 200 with one radar unit would need that radar unit to be able to scan over the full 360 degrees.

If vehicle 200 had two radar units, each would scan approximately 180 degrees. For three radar units, each would be configured to scan 120 degrees. For four radar units, as shown in FIG. 3, each may scan approximated 90 degrees. Five radar units may be configured on vehicle 200 and each may be able to scan 72 degrees. Further, six radar units may be configured on vehicle 200 and each may be able to scan approximately 60 degrees. Other examples are possible In further examples, the number of radar units may be chosen based on a number of criteria, such as ease of manufacture of the radar units, vehicle placement, or other criteria. For example, some radar units may be configured with a planar structure that is sufficiently small. The planar radar unit may be mountable at various positions on a vehicle. For example, a vehicle may have a dedicated radar housing mounted on the top of the vehicle. The radar housing may contain various radar units. In other embodiments, radar units may be placed within the vehicle structure.

When radar units are located within the vehicle structure, each may not be visible from outside the vehicle without removing parts of the vehicle. Thus, the vehicle may not be altered aesthetically, cosmetically, or aerodynamically from adding radar units. For example, radar units may be placed under vehicle trim work, under bumpers, under grills, within housings for lights, within side mirrors, or other locations as well. In some embodiments, it may be desirable to place radar units in positions where the object covering the radar unit is at least partially transparent to radar. For example, various plastics, polymers, and other materials may form part of the vehicle structure and cover the radar units, while allowing the radar signal to pass through.

Additionally, in some embodiments, the radar units may be configured with different scanning ranges for different radar units. For example, in some embodiments a specific radar unit with a wide scanning angle may not be able to be placed on the vehicle in the proper location. Thus, a smaller radar unit, with a smaller scanning angle may be placed in that location. However, other radar units may be able to have larger scanning angles. Therefore, the total scanning angle of the radar units may add up to 360 degrees (or more) and provide full 360 degree azimuthal scanning. For example, a vehicle may have 3 radar units that each scan over 100 degrees and a fourth radar unit that scans over 60 degrees. Thus, the radar units may be able to scan the full azimuth plane, but the scanning sectors may not be equal in angular size.

Figure 4:
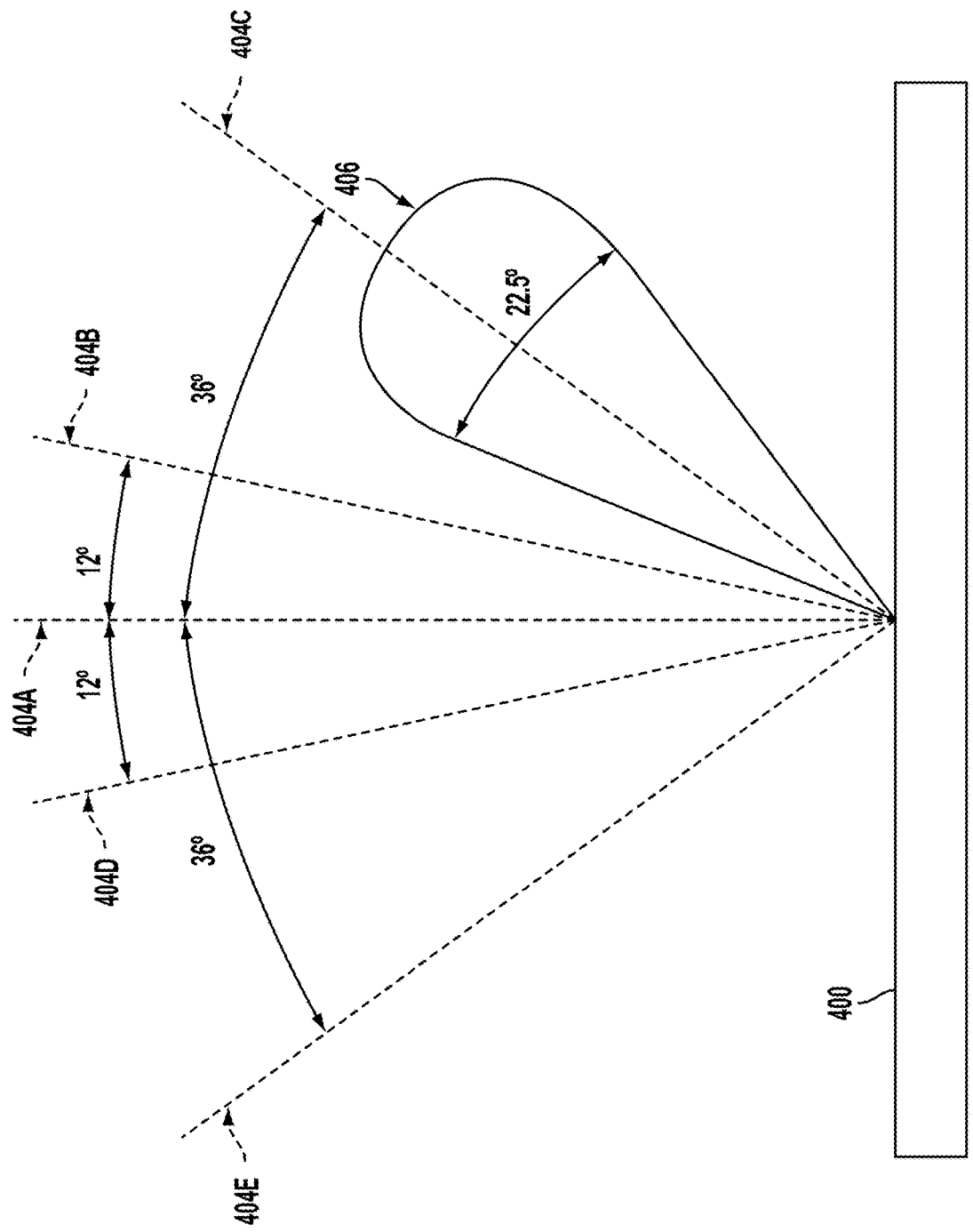
FIG. 4 illustrates beam steering for a sector for a radar unit, according to example embodiments.

FIG. 4 illustrates example beam steering for a sector for radar unit 400. Radar unit 400 may be configured with a steerable beam, i.e., radar unit 400 may be able to control a direction in which the beam is radiated. By controlling the direction in which the beam is propagated, radar unit 400 may be able to direct radiation in a specific direction in order to determine radar reflections (and thus objects) in that direction. In some embodiments, radar unit 400 may be able to scan a radar beam in a continuous manner across the various angles of the azimuth plane. In other embodiments, radar unit 400 may be able to scan the radar beam in discrete steps across the various angles of the azimuth plane.

As shown in FIG. 4, radar unit 400 can generate radar beam 406 that can be steered across a plurality of different angles. As shown in FIG. 4, radar beam 406 may have a half-power beamwidth of approximately 22.5 degrees. The half-power beam width describes the width, measured in degrees, of a main lobe of radar beam 406 between two points that correspond to half the amplitude of the maximum of radar beam 406.

In various embodiments, the half-power beam width of radar beam 406 may be different than 22.5 degrees. Additionally, in some embodiments, the half-power beam width of radar beam 406 may change depending on the angle at which radar beam 406 is pointed. For example, the half-power beam width of radar beam 406 may be narrower when radar beam 406 is pointed more closely to orthogonal 404A (i.e. broadside) direction to the radiating surface and widen and radar beam 406 is steered away from the orthogonal direction 404A.

As further shown in FIG. 4, radar unit 400 may be configured to steer radar beam 406 in different angles (e.g., four different angles). The steering angle may be measured with respect to orthogonal 404A (i.e. broadside) direction to the radiating surface. Radar beam 406 may also be steered to +36 degrees at 404C and −36 degrees at 404E, for example. Also, radar beam 406 may be steered to +12 degrees at 404B and −12 degrees at 404D. The four different angles may represent the discrete angles to which radar beam 406 may be steered.

In some additional examples, radar unit 400 may steer radar beam 406 to two angles simultaneously. For example, radar unit 400 may steer radar beam 406 to both +12 and −12 degrees at the same time. This may result in a beam that is overall steered in the direction of the sum of the angles (e.g. −12+12=0, thus the beam in this example would be in the broadside direction 404a). However, when a radar beam is steered at two directions at once, the half-power beam width of the radar beam may be widened. Thus, a radar resolution may decrease.

By steering radar beam 406 to each of angles 404B-404E, the full 90-degree field of view can be scanned. For example, when radar beam 406 is steered to +36 degrees 404C, the half-power beam width of radar beam 406 will cover from +47.25 degrees to +24.75 degrees (as measured from the broadside direction 404A). Additionally, when radar beam 406 is steered to −36 degrees 404E, the half-power beam width of radar beam 406 can cover from −47.25 degrees to −24.75 degrees. Further, when radar beam 406 is steered to +12 degrees 404B, the half-power beam width of radar beam 406 will cover from +23.25 degrees to +0.75 degrees. And finally, when radar beam 406 is steered to −12 degrees 404D, the half-power beam width of radar beam 406 will cover from −23.25 degrees to −0.75 degrees. Thus, radar beam 406 will effectively be able to scan (i.e. selectively enable or disable the four beams spanning the angular width) from −47.25 to +47.25 degrees, covering a range of 95 degrees. The number of steering angles, the direction of the steering angles, and the half-power beam width of radar beam 406 may be varied depending on the specific example.

For example, and further discussed below, a radar beam of a radar unit may be configured to only scan a 60-degree region. If a radar unit can scan a 60-degree region, six radar units may be used to scan a full 360 azimuth plane. However, if the radar unit can scan 90 degrees, four radar units may scan the full 360 azimuth plane.

Figure 5:
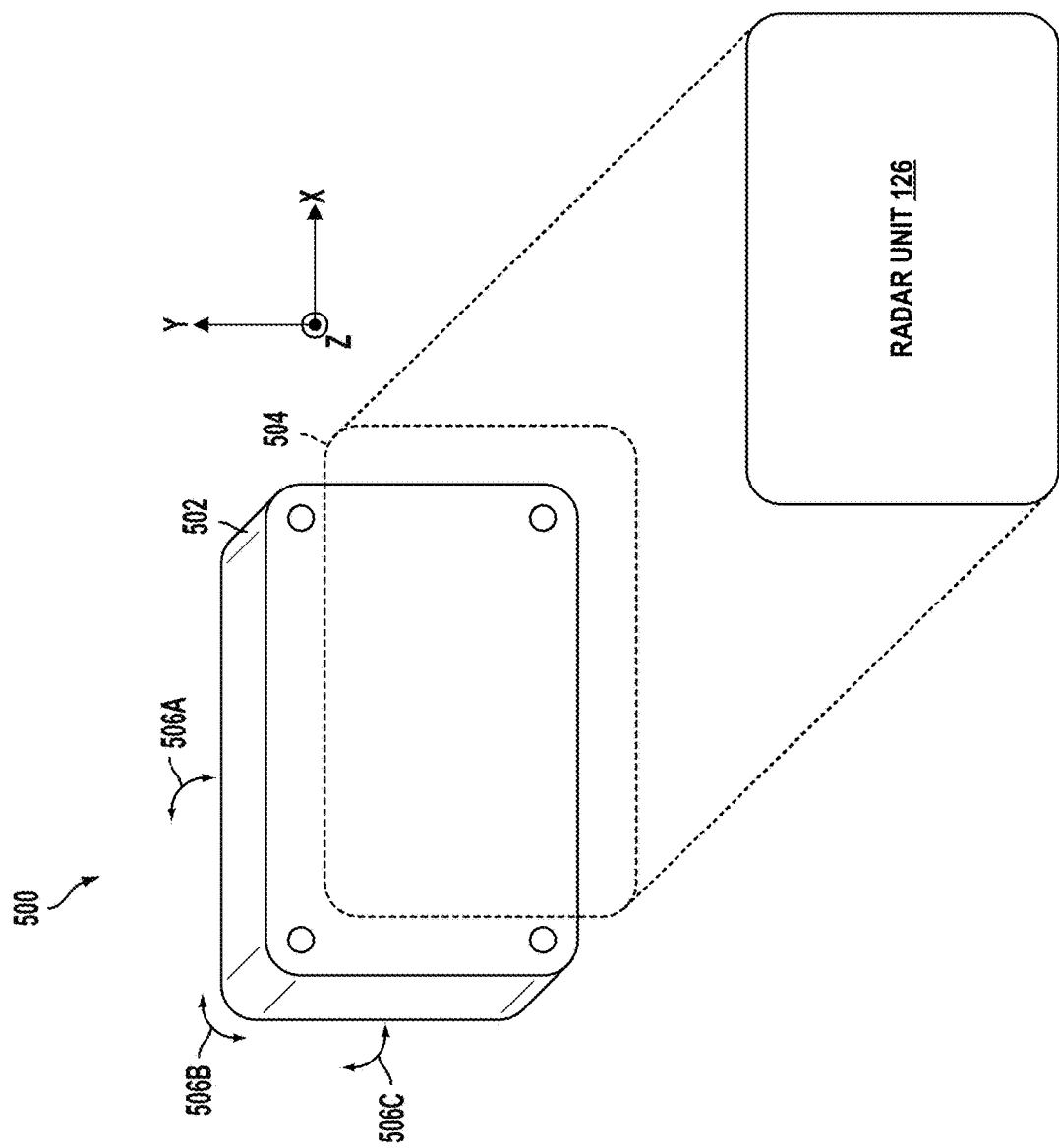
FIG. 5 illustrates a mount for coupling a radar unit to a vehicle, according to example embodiments.

FIG. 5 illustrates an example radar unit mounting structure 500, which can include mounting base plate 502 and an associated mounting location 504. As shown, mounting structure 500 represents one potential configuration for coupling one or multiple radar units to a portion of a vehicle or other entity. In other examples, mounting structure 500 can have other configurations, including more or fewer components.

Mounting structure 500 can position radar unit 126 at various positions and orientations on a vehicle (e.g., vehicle 200). In some instances, mounting structure 500 may configure radar unit 126 to have a vertical orientation relative to the vehicle. In other uses, mounting structure 500 can position radar unit 126 to have other orientations (e.g., horizontal, slanted) relative to the vehicle. As such, mounting location 504 represents the location for coupling radar unit 126 to mounting baseplate 502.

As further shown in FIG. 5, mounting base plate 502 may include mounting holes configured to both align and couple radar unit 126. Mounting base plate 502 of FIG. 5 is one example of a way the various radar units may be mounted to an autonomous vehicle. When radar unit 126 is mounted to mounting baseplate 502, radar unit 126 may not be exactly aligned as designed. This misalignment may manifest as an offset from the desired mounting position. For example, radar unit 126 may have an offset when coupled to mounting baseplate 502 in terms of the elevational angle offset 506a, roll angle offset 506b, and azimuthal angle offset 506c.

Additionally, radar unit 126 can have an offset when coupled to mounting baseplate 502. For instance, in some examples, the offset can differ in terms of the X offset, Y offset, and Z offset. The offset can depend on various factors, such as a desire for radar unit 126 to be mounted within a threshold range around a desired direction. As such, when the radar unit is mounted within a known, threshold range, the offset of the radar unit may be calculated enabling radar signals to be processed with the offset factored. For example, each of elevational angle 506A, roll angle 506B, and azimuthal angle 506C may have a threshold range of ±1 degree from the desired elevational angle, roll angle, and azimuthal angle. By determining the offsets, a processing system can mathematically compensate for the difference between the desired alignment and the actual alignment.

Figure 6:
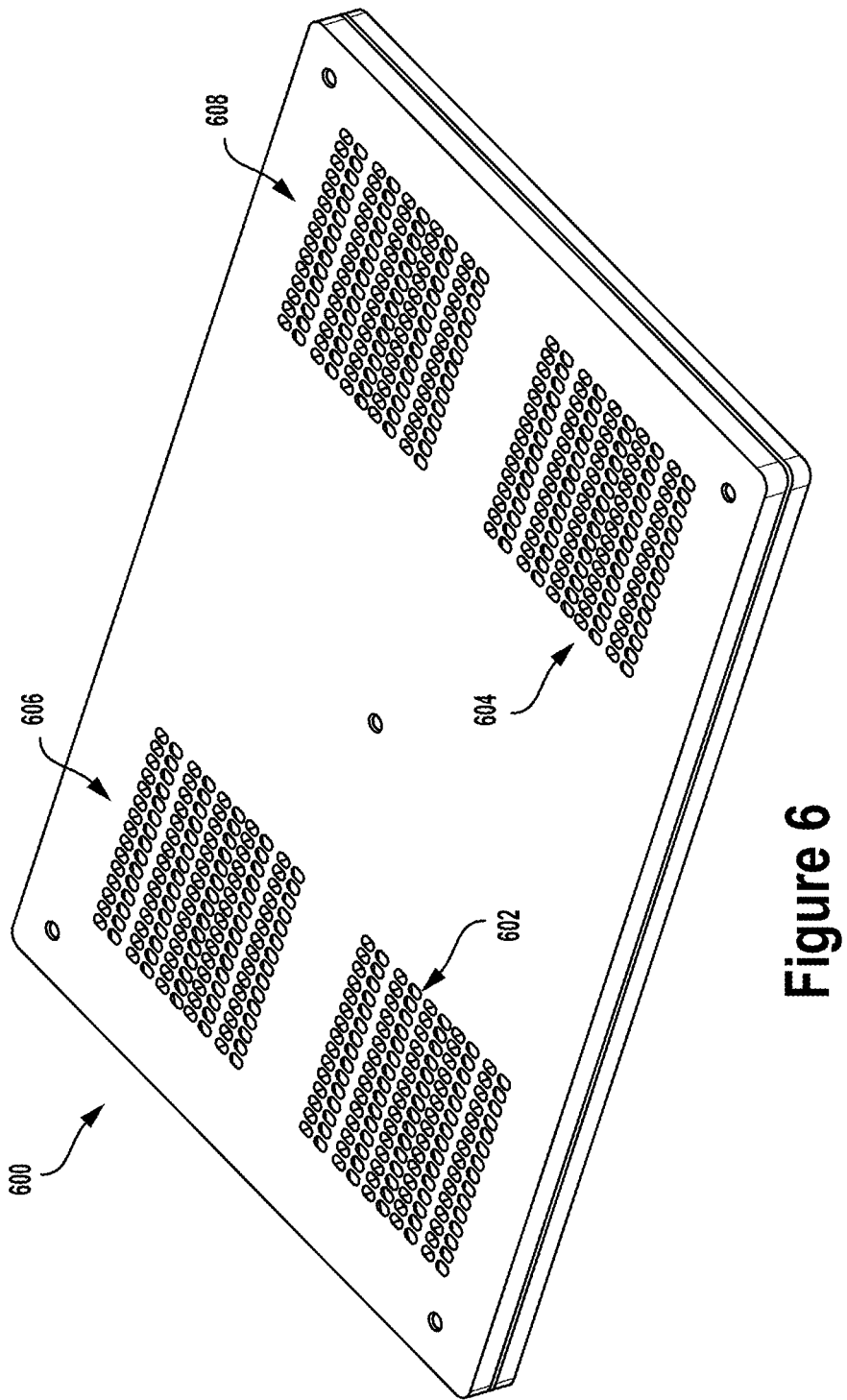
FIG. 6 illustrates a radar unit configured with antenna arrays, according to example embodiments.

FIG. 6 illustrates radar unit 600 configured with antenna arrays. Radar unit 600 represents an example configuration for a radar unit that includes antenna arrays, such as antenna array 602, 604, 606, and 608. As such, other radar units with antenna arrays can have other configurations. For example, another radar unit may include more or fewer antenna arrays.

Radar unit 600 may operate as part of a radar system (e.g., a vehicle radar system). For instance, a vehicle radar system may include multiple radar units coupled to a vehicle at various positions (or built into components of the vehicle) enabling radar to capture measurements of areas extending around the vehicle. In other applications, radar unit 600 may operate as a standalone system configured to measure areas of an environment.

As shown in FIG. 6, radar unit 600 includes multiple arrays of antennas, including array 602, array 604, array 606, and array 608. Parameters of these arrays differ despite each array operating as part of radar unit 600. In particular, arrays 602, 604 are shown positioned near one side of radar unit 600 and arrays 606, 608 are shown positioned near the opposing side of radar unit 600. In addition, the quantity and arrangement of antennas in each array differs on radar unit 600, but can have similar quantities in other examples.

Further, each array of radar unit 600 can represent a transmission antenna array, reception antenna array, or a combination of transmission and reception antennas in an array. For instance, array 602 may be a transmission array that is configured to emit radar signals using electromagnetic waves from waveguides within radar unit 600 and array 604 may be a reception array configured to receive the reflections of radar signals that have reflected off features in the environment and back towards radar unit 600. In other examples, array 602 and array 604 may both be reception arrays or transmission arrays. As such, radar unit 600 may capture and provide received radar reflection signals to a system (e.g., a processor of the radar system) for processing to determine spatial data for a region of the environment.

In some examples, near-field measurements made using radar unit 600 may experience undesirable effects that impact their accuracy. The undesirable effects can be caused by various factors, such as the configuration of transmission and/or reception antenna arrays on the radar unit (e.g., arrays on radar unit 600), the degree of curvature of emitted radar signals as the radar signals propagate away from the radar unit, and the degree of curvature of radar reflection signals as the radar reflection signals travel back towards the radar unit.

Figure 7A:
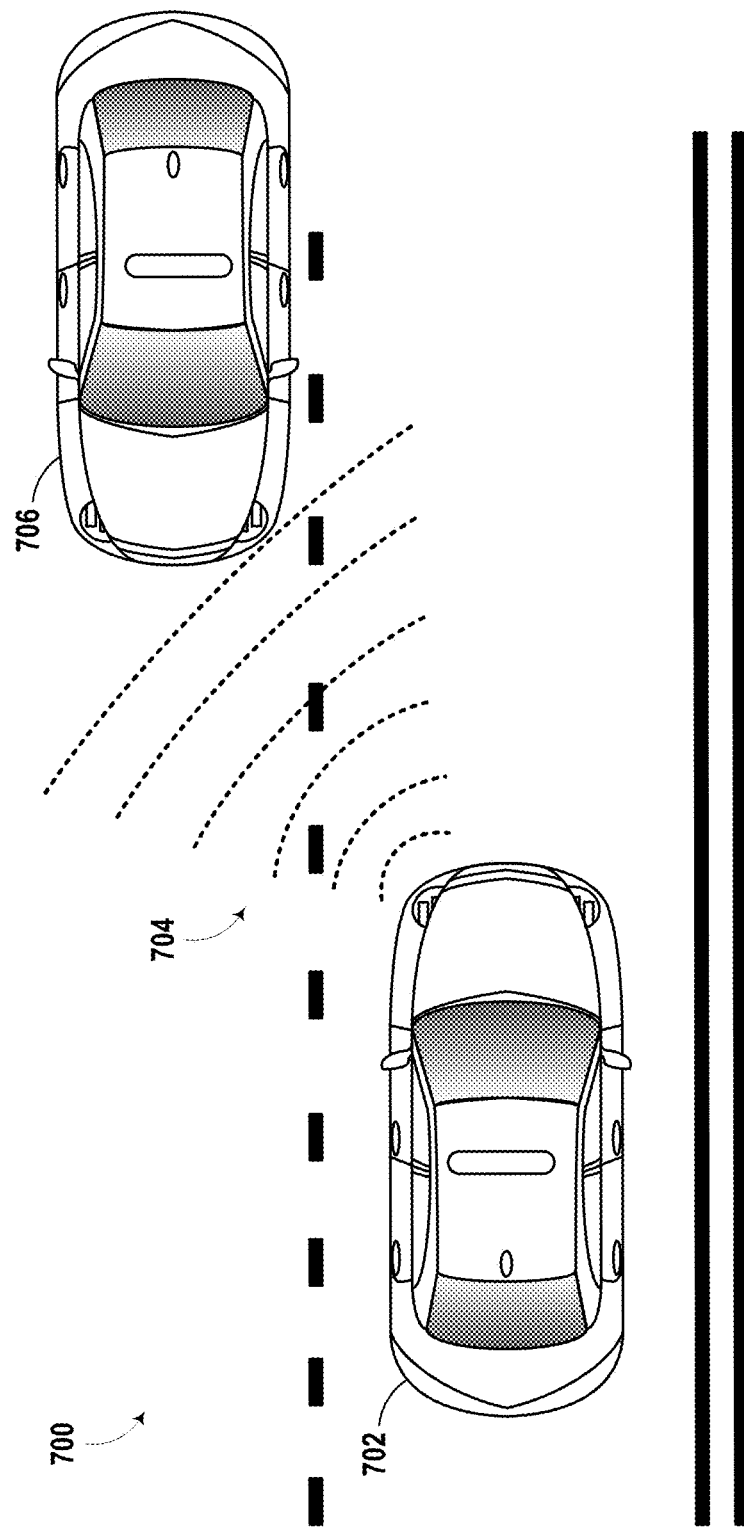
FIG. 7A illustrates a scenario involving a vehicle radar system detecting a nearby vehicle, according to example embodiments.

FIG. 7A illustrates scenario 700 involving a vehicle radar system detecting a nearby vehicle. Particularly, scenario 700 shows an aerial view of vehicle 702 using radar to measure nearby areas of the environment, including an area that includes a portion of vehicle 706. As such, scenario 700 represents one possible implementation involving a vehicle using radar to measure the environment, but other examples are possible.

Vehicle 702 represents a vehicle that may use radar to measure the environment. For instance, vehicle 702 may correspond to vehicle 200 described in FIG. 2 or other potential vehicles configured with a radar system. The type of radar units within the radar system can vary. For instance, one or more radar units may have a MIMO configuration with one or more transmission antenna arrays and reception antenna arrays. In addition, vehicle 706 may also be using a radar system to measure the nearby environment (not shown).

As shown in FIG. 7A, signals 704 represent radar signals transmitted by one or more radar units coupled to vehicle 702. In other examples, signals 704 may represent radar reflection signals received by one or more radar units. For instance, a radar unit coupled to vehicle 702 may receive radar reflection signals using a reception antenna array. As such, radar system may transmit signals 704 and receive radar reflection signals that correspond to signals 704 after signals 704 reflect off surfaces in the environment, such as the road and vehicle 706. Signals 704 are shown for illustration purposes and may not be visible in real-world implementations.

As further shown in FIG. 7A, signals 704 appear to decrease in degree of curvature as signals 704 travel from the radar unit coupled to vehicle 702. Reflections of signals 704 that reflect off vehicle 706 and other surfaces in the environment of vehicle 702 may increase in curvature as the reflected signals travel towards and advance near the reception antenna array or arrays of the radar unit(s) of vehicle 702. In particular, as discussed above, the curvature of the reflected radar signals approaching reception antenna arrays of radar units coupled to vehicle 702 and/or the curvature of newly transmitted radar signals propagating away from transmission antenna arrays of radar units coupled to vehicle 702 can reduce the accuracy of measurements determined for the near-field of vehicle 702 determined based on the transmission and reception of signals 704. As a result, a vehicle control system of vehicle 702 may not be able to rely upon near-field measurements made using radar.

To increase the accuracy of near-field measurements determined based on the transmission and reception of signals 704, a filter may be determined. In particular, the filter may offset undesirable effects that can impact near-field measurements generated based on radar. In some example implementations, signals 704 may represent radar signals emitted by one or multiple arrays of radiating elements positioned on a radar unit. For example, a MIMO radar unit can transmit and receive signals 704 to obtain 2D measurements of desired regions near vehicle 700 and a filter may be determined to offset undesirable effects that can arise when determining near-field measurements (e.g., an area extending from the radar units up to 20 meters away from vehicle 702 in the direction of travel of signals 704).

In some examples, the determined filter may offset undesirable effects that can arise from one or more sources. For instance, the filter may offset undesirable effects that can arise from the curvature of received reflected radar signals as reception antenna arrays receive them. The filter may offset undesirable effects that can arise due to the proximity of antennas within the transmission and/or reception antenna arrays. In addition, the filter may also offset undesirable effects that may be caused by other factors, such as the proximity of arrays on the radar unit, the weather conditions of the environment, among other potential factors.

After determining the filter based on transmitting and receiving signals 704, the filter can be used when processing subsequent radar signals. In some instances, the filter is developed based on the information provided by transmitting and receiving signals 704 and other potential radar signals. The filter may depend on the azimuth angle and the distance relative to the radar unit (factoring in the radar unit's change in position) of one or more surfaces in the environment that reflected signals 704 back towards the radar unit. For example, the filter may depend on the azimuth angle and the distance associated with any traffic signs, road boundaries, other vehicles (e.g., vehicle 706), and other surfaces in the environment that reflected the radar signals back to the radar unit that were used to determine the filter. In further examples, the filter may depend on the elevation angle of one or more surfaces in the environment reflecting signals 704 back towards the radar unit for reception by one or more reception antenna arrays.

Figure 7B:
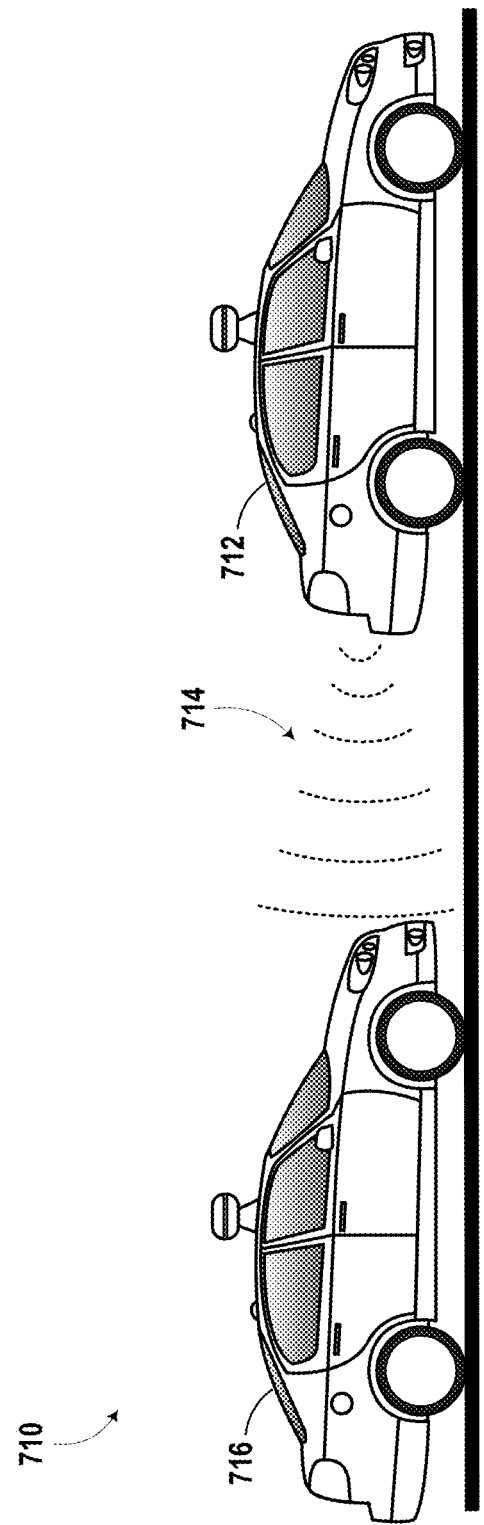
FIG. 7B illustrates another scenario involving a vehicle radar system detecting a nearby vehicle, according to example embodiments.

FIG. 7B illustrates scenario 710 involving a vehicle radar system detecting a nearby vehicle. In particular, scenario 710 includes vehicle 712 using radar to measure the environment, including an area behind vehicle 712 that includes vehicle 716. Other scenarios involving use of vehicle radar systems are possible.

Similar to vehicle 702 depicted in FIG. 7A, vehicle 712 represents a vehicle that may use radar to measure the environment. In some instances, radar used by a vehicle radar system of vehicle 712 may supplement other sensor measurements (e.g., LIDAR, camera images). Signals 714 shown in FIG. 7B represent radar signals that may be transmitted by one or more antenna arrays of one or more radar units. The radar units may be coupled at various positions on vehicle 712, including on or nearby the bumper, the brake lights, or other portions of vehicle 712 (e.g., external wings extending from a roof of vehicle 712).

Processing the reflections of signals 714 off surfaces in the environment (e.g., vehicle 716) may produce measurements of the environment for a vehicle control system of vehicle 712 to use during navigation. For instance, the vehicle control system may use radar measurements to detect potential obstacles, monitor road elements (e.g., follow road boundaries), and perform other potential operations. The vehicle control system may use radar measurements extending behind vehicle 712 to detect the presence and speed of other vehicles navigating nearby vehicle 712 (e.g., vehicle 716). In some instances, the vehicle control system may use radar measurements to detect when vehicle 716 is changing lanes while navigating behind vehicle 712. As a result, vehicle 712 may identify when vehicle 716 may pass around vehicle 712.

In some examples, the radar measurements obtained by the vehicle radar system may accurately depict the position, motion, and spatial orientation of features in the environment that are positioned at least a threshold distance away from vehicle 712. In particular, measurements of the mid-field and far-field environment (i.e., areas of the environment positioned at least the threshold distance (e.g., ~20 meters or farther) from vehicle 712) may be accurate since measurements made using radar at these ranges may not decrease in accuracy from undesirable effects that can potentially impact near-field measurements. To further illustrate, mid-field and far-field environment measurements may be made using radar signals and radar reflection signals that do not have much curvature unlike near-field measurements that may rely upon radar with increased curvature. Further, the spacing, orientation, and configuration of the transmission and reception antenna arrays may not impact the accuracy of mid-field and far-field measurements of the environment as much as these factors can potentially impact the accuracy of near-field measurements. As such, in some examples, the vehicle control system of vehicle 712 may use measurements depicting the environment beyond a threshold distance (e.g., 20 meters or farther to an extent) without further processing when determining control strategies.

As indicated above, near-field radar measurements can have some degree of inaccuracy due to various factors, such as the position and configuration of antenna arrays transmitting and/or receiving radar as well as the curvature of radar reflection signals received by reception antenna arrays of a radar unit. To illustrate, FIG. 7B shows signals 714 decreasing in curvature as signals 714 propagate farther from vehicle 712. This decrease in curvature can occur as signals 714 move farther from the radar unit transmitting the radar signals an expand in size. Similarly, reflections of signals 714 may increase in degree of curvature as the signals travel closer to the reception array(s) of the radar units receiving them. In some instances, the reflections may increase in curvature since the reflections are decreasing in overall size as they enter the near-field of the radar unit and approach reception antenna arrays of the radar unit.

In some examples, vehicle 712 may use signals 714 to assist during braking processes. For instance, vehicle 712 may use signals 714 to determine how far to stop from a vehicle traveling in front of vehicle 712 or to assist with timing of applying brakes (i.e., when to initiating a braking process). As an example, vehicle 712 may determine that vehicle 716 corresponds to a vehicle driven by a less experienced driver, a distracted driver, or an aggressive driver based on detected movements or other information acquired regarding vehicle 716. As such, vehicle 712 may use radar (e.g., signals 714) to determine when to initiate braking and how far to stop from a vehicle in front of vehicle 712 in response to detecting that vehicle 716 is currently being operated by a less experienced, distracted, or aggressive driver. In turn, vehicle 712 may reduce risks associated with vehicle 716 potentially tailgating vehicle 712 (i.e., traveling too close to vehicle 712 or braking too late due to potential distractions). For example, vehicle 712 may adjust its speed or path to avoid and increase space away from vehicle 716. In further examples, vehicle 712 may use near-field radar to maintain a buffer around vehicle 712 to increase safety and obstacle avoidance during operation.

FIG. 7C illustrates scenario 720 involving a vehicle radar system detecting nearby traffic sign 726. Similar to scenario 700 and scenario 710 illustrated in FIGS. 7A and 7B, respectively, scenario 720 involves vehicle 722 measuring regions of the environment using radar (e.g., signals 724). For instance, the vehicle radar system of vehicle 722 may include radar units having MIMO configurations with one or multiple transmission and reception antenna arrays. As such, scenario 720 represents another potential situation where a vehicle may use radar to measure the environment, including the near-field of the vehicle. Other scenarios are possible.

As shown in FIG. 7C, as transmitted signals 724 progress farther from the radar unit or units, the curvature of signals 724 may decrease, that is a wave front of the signal may become more planar. Signals 724 may expand into more space as they traverse the environment reducing the overall curvature of signals 724 (as shown as signals 724 approach traffic sign 726). Likewise, reflections of signals 724 that are reflected by surfaces in the environment may have a large curvature near the reflection surface. If the radar unit(s) of the vehicle radar system of vehicle 722 are located near a reflector, the signal processing discussed herein may be useful to mitigate the curvature effects. The reflections may decrease in curvature as the distance between the surface causing the reflections and the reception antenna array increases.

As discussed above, example radar systems can include various types of radar units. In some cases, a radar system may include radar units configured with transmission antennas and reception antennas arranged in arrays. For instance, a radar unit may have a MIMO configuration that involves using a transmission antenna array to transmit radar signals towards a region in the environment and a reception antenna array to receive reflections of the transmitted radar signals. Upon reception of the reflected radar signals, a processor associated with the radar system can process the reflections to determine a 2D representation of the measured region of the environment.

In some instances, near-field measurements made using radar may include some degree of inaccuracy. Particularly, undesirable effects caused by the curvature of incoming radar reflection signals and/or the curvature of outgoing transmitted radar signals, the configuration and proximity of antenna arrays on a radar unit, as well as other potential factors. To reduce or even potentially eliminate the inaccuracy of the near-field measurements, a filter may be determined that can factor and potentially offset undesirable effects that can impact accuracy. In further examples, the filter may also reduce noise that can arise in radar measurements.

As an example illustration, a process for determining a filter that can potentially enhance near-field measurements may involve using an example radar system that includes $N_r$ receive channels and $N_t$ transmit channels. These channels may correspond to a single radar unit or a combination of radar units that make up the radar system (or a portion of the radar system). In addition, $N_p$ may represent the number of pulses performed by the radar system during operation and $N_k$ may represent the number of analog-to-digital convert (ADC) samples per pulse. In some examples, the radar system may use a pulse-Doppler stretch LFM waveform with intra-channel pulse repetition frequency $f_p$ and inter-pulse period $I_p$. Other examples may involve using other types of waveforms and various inter-pulse periods.

As such, the radar system may operate in a time-division multiple access (TDMA) operation mode with $N_t$ transmit channels activated in sequence after each pulse such that the time interval between channels is represented by $I_c$. In some instances, the inter-pulse period $I_p$ may equal the interval between channels ($I_c$) multiplied by the number of transmit channels of the radar system ($N_t$) as shown in equation [1].

$$I_p = I_c * N_t \qquad [1]$$

Further expanding upon the above illustration, n may represent the pulse indexing variable, p may represent the transmit channel indexing variable, $v_p$ may represent the location of the $p^{th}$ transmit channel in the antenna frame, q may represent receive channel indexing variable, and $v_q$ may be the location of the $q^{th}$ receive channel in the antenna frame. In addition, the example may involve using a 2D antenna array geometry with antenna phase centers located in the x=0 plane in the radar basis arranged as a $T_x$ and $R_x$ horizontal Uniform Linear Array (ULA). Further, $\hat{v}$ may represent a vector that defines the constant spacing between successive transmit or receive antennas. In some instances, $\hat{v}$ may equal zero except along the y-dimension resulting in the $p^{th}$ and $q^{th}$ transmit and receive channels having locations as represented by equations [2] and [3], respectively.

$$u_p = u_0 + \hat{u} p \qquad [2]$$

$$v_q = v_0 + \hat{v} q \qquad [3]$$

Modeling a single scattering discrete in the far field may involve expressing dynamical quantities in the radar basis, which is centered at some point on the antenna face with the x-axis along antenna boresight and the y-axes and z-axes embedded in the plane of the antenna array in a right-handed fashion. In some examples, starting the coherent processing interval (CPI) at time equals zero (t=0), $g_0$ may represent the position of the scatterer (e.g., surface in the environment) in the radar basis. The scatterer may be stationary in the local inertial frame (ENU), but may also have motion in the radar basis.

Further, in the example illustration, h may represent the radar velocity (taken to be constant over the CPI) in the local inertial frame expressed in the radar basis with the assumption that its z-component equals zero. In addition, in the example illustration, w may represent angular velocity in the local inertial frame expressed in the radar with the assumption that the x and y component of angular velocity are zero. Other assumptions may be made as well, such that the range is much longer than the antenna baseline and the dynamical quantities are constant during a pulse, but vary from pulse-to-pulse and channel-to-channel. Accordingly, the position of the scatterer (i.e., surface in the environment) at time t can then expressed in the following equations.

$$g(t) = [g_x(t), g_x(t), g_z(t)]^T \qquad [4]$$

$$g_x(t) = [\cos(w_z t), -\sin(w_z t), 0]^T \cdot (g_0 - ht) \qquad [5]$$

$$g_y(t) = [\sin(w_z t), \cos(w_z t), 0]^T \cdot (g_0 + ht) \qquad [6]$$

$$g_z(t) = g_{0z} \qquad [7]$$

At pulse n, the two way range extending from antenna p to the scatterer and back to antenna q can be determined using equation [8].

$$r_{n,p,q} = |g(nI_p + pI_c) - u_p| + |g(nI_p + pI_c) - v_q| \qquad [8]$$

To place range in the context of the measured phase history, the example illustration may be modeled using a pulse-Doppler stretch LFM system. Ignoring potential noise, reflection magnitude, and any unknown constant phase, then the signal phase after digitization may then be represented by equation [9].

$$p_{k,n,p,q} = \frac{2\pi\gamma k r_{n,p,q}}{(cf_s)} + \frac{2\pi f r_{n,p,q}}{c} - \frac{\pi\gamma r_{n,p,q}^2}{c^2} \qquad [9]$$

As shown in equation [9], c represents the propagation speed, $f_s$ represents the ADC sampling frequency, f represents the RF center frequency, and k represents the ADC indexing variable. As also shown in equation [9], the usual factor of 4 may be changed to 2 to reflect that the range variable is a two-way range. Further, the third term in equation [9] corresponds to the residual video phase and may be small enough to ignore during calculations. Accordingly, the signal phase after digitization can be determined using equation [10].

$$p_{k,n,p,q} = \frac{2\pi\gamma k r_{n,p,q}}{(cf_s)} + \frac{2\pi f r_{n,p,q}}{c} \qquad [10]$$

Figure 8A:
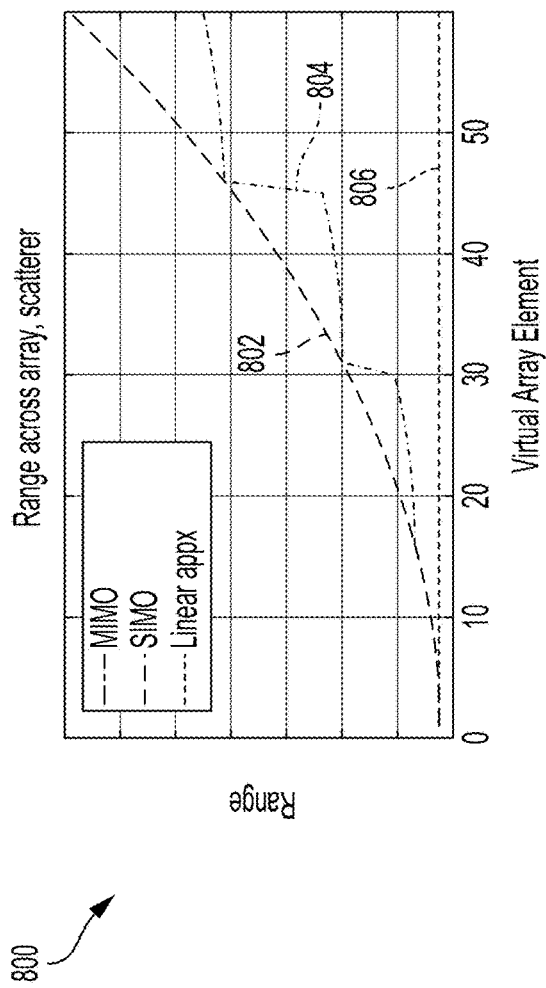
FIG. 8A illustrates a graph depicting the range across an antenna array of a radar unit, according to example embodiments.

To further illustrate, FIG. 8A shows graph 800 depicting the range across an antenna array of a radar unit. As shown, graph 800 depicts the phase history across the MIMO aperture of a radar unit. For example, graph 800 may depict the phase history for a set of waveform parameters and antennas configured as an antenna unit with an array, stationary radar and scatterer (e.g., surface in the environment) located at a particular location (e.g., [10, 0, 0]), the following two-way range. Graph 800 includes SIMO line 802 representing the range of a SIMO radar antenna, MIMO line 804 representing the range of a MIMO radar antenna, and linear approximation 806. Graph 800 may correspond to a range plot that expresses the difference in range across the array between a planar wave front approximation (i.e., linear range approximation 806), an equivalent SIMO array (i.e., SIMO line 802), and the antenna unit MIMO array (i.e., MIMO line 804).

For a SIMO system, this may represent a small amount of quadratic phase error, which can slightly increases the width of the impulse response of the beam former. As such, the linear approximation error for the MIMO array may be undesired and range error may be roughly quadratic for 4 subsets of the array, but each subset may undergo a step change in error at its boundary. This periodic step change may induce a phase modulation across the array with a harmonic spectrum with an error that is larger at near range. In some instances, the error can be a large enough fraction of a wavelength to substantially impact matched filter sidelobes.

Figure 8B:
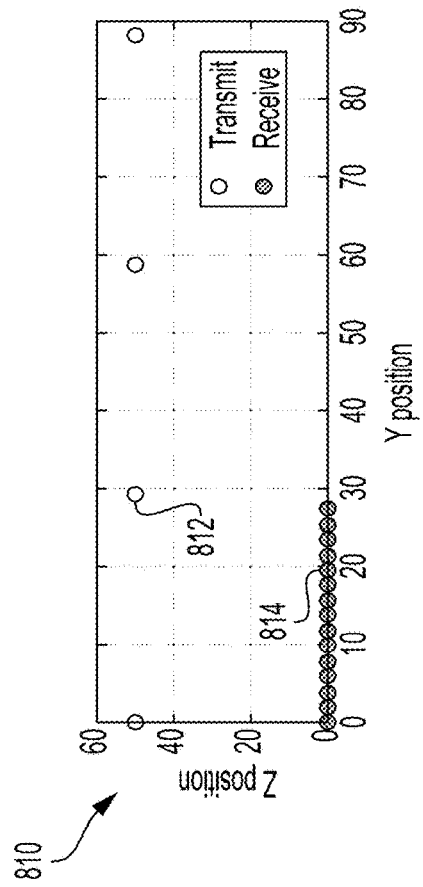
FIG. 8B illustrates a graph depicting the range across an antenna array of a radar unit, according to example embodiments.

In some instances, graph 800 depicted in FIG. 8A may be generated using the example array geometry represented in graph 810 illustrated in FIG. 8B. Particularly, graph 810 shows the relative positions of the phase centers of antenna elements of an example antenna arrangement for a radar unit.

Figure 8C:
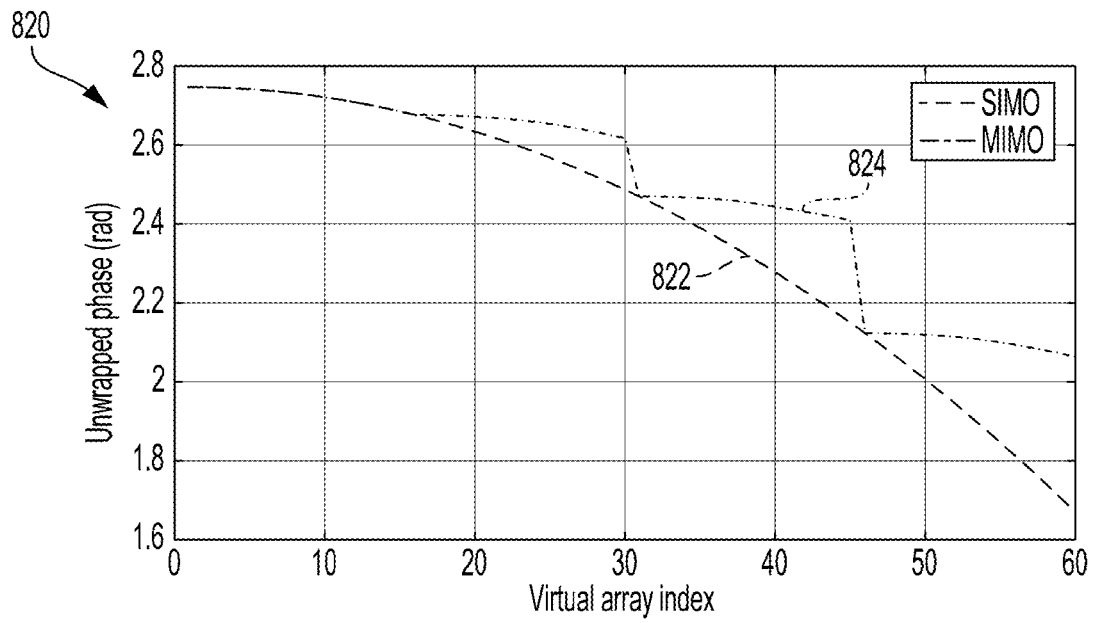
FIG. 8C illustrates a graph depicting an unwrapped phase versus virtual array index, according to example embodiments.

FIG. 8C illustrates graph 820 depicting an unwrapped phase across an array of a radar unit. As shown in the graph illustrated in FIG. 8C, there may be periodic jumps in the MIMO phase history (i.e., MIMO line 824) relative to the SIMO phase history (i.e., SIMO line 822).

Figure 8D:
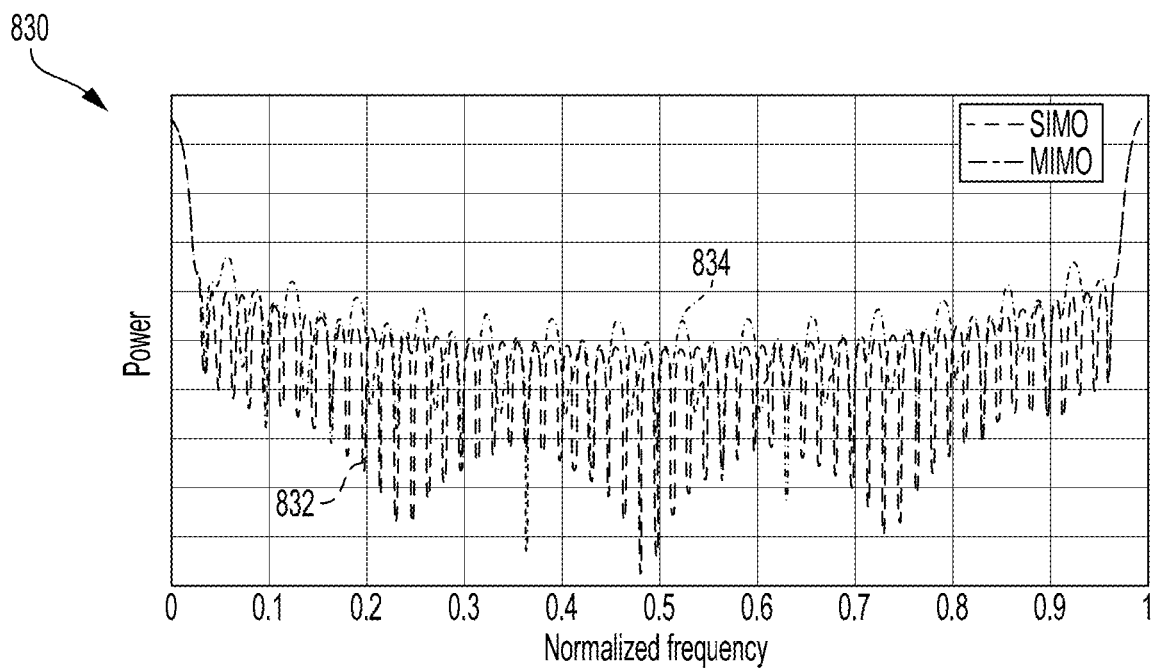
FIG. 8D illustrates a graph depicting azimuth spectrum, according to example embodiments.

The appropriate matched filter for the planar wave front approximation may be a Fast Fourier transform (FFT) or more generally, a Discrete Fourier transform (DFT). FIG. 8D illustrates graph 830 depicting azimuth spectrum. For example, graph 830 may depict an output of an FFT of the simulated phase history that produces a comb structure induced by the phase modulation that sits at approximately −25 decibels (dB). As shown in FIG. 8D, graph 830 includes SIMO data 832 and MIMO data 834. These artifacts can potentially create unwanted image artifacts. As previously shown above, the full expression of two way range was represented in equation [11]. Further, a linear approximation of equation [6] is also shown below as equation [12].

$$r_{n,p,q} = |g(nI_p + pI_c) - u_p| + |g(nI_p + pI_c) - v_q| \qquad [11]$$

$$r_{n,p,q} \approx |g_0 - u_p| + |g_0 - v_q| + \qquad [12]$$
$$(nI_p + pI_c)\left(\frac{g_0 - u_p}{|g_0 - u_p|} + \frac{g_0 - v_q}{|g_0 - v_q|}\right) \cdot (g_0 \times w - h)$$

The remaining normal (e.g., $|g_0-u_p|$) can be removed with a reasonable assumption can be that a linear approximation of these norms in space (spatial index p) may be used as shown in equation [13].

$$|g_0 - u_p| \approx |g_0| - u_p \cdot \frac{g_0}{|g_0|} \qquad [13]$$

Quadratic approximations of the norms are represented in equation [14] and equation [15].

$$|g_0 - u_p| \approx |g_0 - u_0| - \frac{(g_0 - u_0) \cdot \hat{u}}{|g_0 - u_0|}p + \left[\frac{\hat{u} \cdot \hat{u}}{|g_0 - u_0|} - \frac{((g_0 - u_0) \cdot \hat{u})^2}{|g_0 - u_0|^3}\right]\frac{p^2}{2} \qquad [14]$$

$$|g_0 - v_q| \approx |g_0 - v_0| - \frac{(g_0 - v_0) \cdot \hat{v}}{|g_0 - v_0|}q + \left[\frac{\hat{v} \cdot \hat{v}}{|g_0 - v_0|} - \frac{((g_0 - v_0) \cdot \hat{v})^2}{|g_0 - v_0|^3}\right]\frac{q^2}{2} \qquad [15]$$

Noting that the array can be constrained such that $u_{0x}=v_{0x}=\hat{u}_x=\hat{u}_z=\hat{v}_x=\hat{v}_z=0$, then the expressions reduce to equation [16]. Other arrays may use the following constraints in additional examples.

$$|g_0 - u_p| \approx \qquad [16]$$
$$|g_0 - u_0| - \frac{(g_{0y} - u_{0y}) \cdot \hat{u}_y}{|g_0 - u_0|}p + \left[\frac{\hat{u}_y^2}{|g_0 - u_0|} - \frac{(g_{0y} - u_{0y})^2 \cdot \hat{u}_y^2}{|g_0 - u_0|^3}\right]\frac{p^2}{2}$$

$$|g_0 - v_q| \approx \qquad [17]$$
$$|g_0 - v_0| - \frac{(g_{0y} - v_{0y}) \cdot \hat{v}_y}{|g_0 - v_0|}q + \left[\frac{\hat{v}_y^2}{|g_0 - v_0|} - \frac{(g_{0y} - v_{0y})^2 \cdot \hat{v}_y^2}{|g_0 - v_0|^3}\right]\frac{q^2}{2}$$

Further assuming that $u_0=[0, 0, 0]^T$ and $v_0 \approx [0, 0, 0]^T$, then equation [18] and equation [19] are possible.

$$|g_0 - u_p| \approx |g_0| - \frac{(g_{0y} - u_{0y}) \cdot \hat{u}_y}{|g_0|}p + \left[\frac{\hat{u}_y^2}{|g_0|} - \frac{(g_{0y} - u_{0y})^2 \cdot \hat{u}_y^2}{|g_0|^3}\right]\frac{p^2}{2} \qquad [18]$$

-continued $$|g_0 - v_q| \approx |g_0| - \frac{(g_{0y} - v_{0y}) \cdot \hat{v}_y}{|g_0|} q + \left[\frac{\hat{v}_y^2}{|g_0|} - \frac{(g_{0y} - v_{0y})^2 \cdot \hat{v}_y^2}{|g_0|^3}\right]\frac{q^2}{2} \quad [19]$$

In addition, if the scatterer bearing angle is θ, then equation [20] and equation [21] are true.

$$|g_0 - u_p| \approx |g_0| - \sin(\theta)\hat{u}_y p + \left[\frac{\hat{u}_y^2}{|g_0|} - \frac{\sin^2(\theta)\hat{u}_y^2}{|g_0|}\right]\frac{p^2}{2} \quad [20]$$

$$|g_0 - v_q| \approx |g_0| - \sin(\theta)\hat{v}_y q + \left[\frac{\hat{v}_y^2}{|g_0|} - \frac{\sin^2(\theta)\hat{v}_y^2}{|g_0|}\right]\frac{q^2}{2} \quad [21]$$

Recall that range is represented in equation [22].

$$r_{n,p,q} \approx |g_0 - u_p| + |g_0 - v_q| + (nI_p + pI_c)\left(\frac{g_0 - u_p}{|g_0 - u_p|} + \frac{g_0 - v_q}{|g_0 - v_q|}\right) \cdot (g_0 \times w - h) \quad [22]$$

Substituting terms and making the same small angle approximations results in equation [23].

$$r_{n,p,q} \approx 2|g_0| - \sin(\theta)(\hat{u}_y p + \hat{v}_y q) + \frac{\hat{u}_y^2 p^2 + \hat{v}_y^2 q^2}{2|g_0|} - \frac{\sin^2(\theta)}{2|g_0|}(\hat{u}_y^2 p^2 + \hat{v}_y^2 q^2) - 2(nI_p + pI_c)\frac{g_0}{|g_0|} \cdot h \quad [23]$$

Figure 8E:
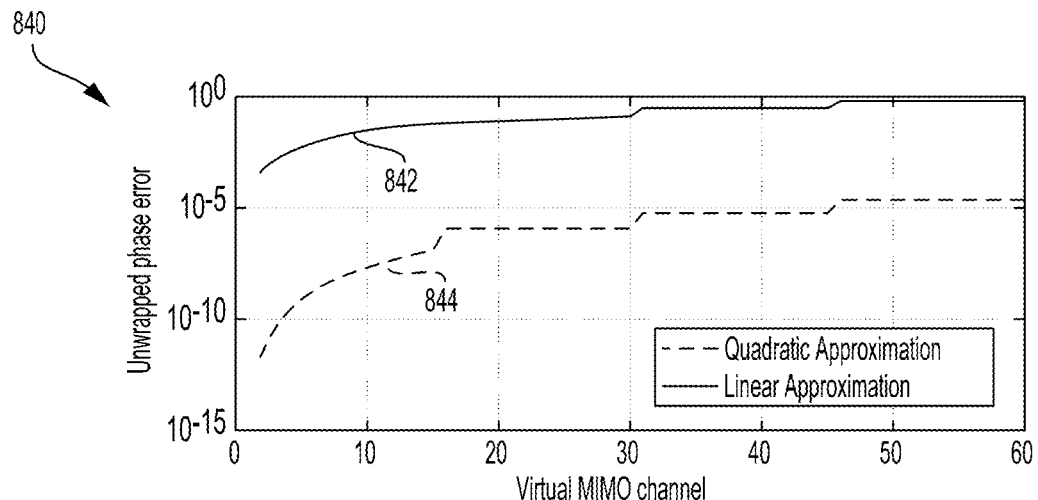
FIG. 8E illustrates a graph depicting unwrapped phase error versus virtual MIMO channel, according to example embodiments.

The approximation in equation [23] can permit phase history reconstruction. To further illustrate, FIG. 8E illustrates graph 840 depicting unwrapped phase error versus virtual MIMO channel. In particular, graph 840 shows absolute unwrapped phase error across MIMO virtual channels between linear approximation 842 and quadratic approximation 844 as previously discussed above. In FIG. 8E, cumulative phase error of the linear model grows to about one radian while the quadratic model keeps phase error below a given error amount (e.g., 0.00001 radians).

The quadratic model can be accurate, but difficult to manage. To illustrate why the model can be difficult to manage, start with the received signal (s). This is modeled as a deterministic phase (ρ), a random complex scale factor (A), and corrupted by an additive white noise process (Γ). For this analysis, fast time (k) and slow time (n) can be suppressed producing equation [24].

$$s_{p,q} = Ae^{j\rho_{p,q}} + \Gamma_{p,q} \quad [24]$$

Given this signal, the function below shown in equation [25] can be proportional to the bearing angle likelihood function.

$$L(\theta) = \Sigma_{p,q} s_{p,q} \exp[-j\hat{\rho}_{p,q(\theta)}] \quad [25]$$

The matched filter selects the value of θ that maximizes the magnitude of L. If the quadratic range model derived above in the estimator, then $\hat{\rho}$ is expressed in equation [26].

$$\hat{\rho}_{p,q} = \frac{2\pi f}{c}\Bigg[ -\sin(\theta)(\hat{u}_y p + \hat{v}_y q) + \frac{1-\sin^2(\theta)}{2|g_0|}(\hat{u}_y^2 p^2 + \hat{v}_y^2 q^2) - 2(nI_p + pI_c)\frac{g_0}{|g_0|} \cdot h \Bigg] \quad [26]$$

In equation [26], $-\sin(\theta)(\hat{u}_y p + \hat{v}_y q)$ represents the linear component of azimuth phase history, which is FFT friendly, and $$\frac{1-\sin^2(\theta)}{2|g_0|}(\hat{u}_y^2 p^2 + \hat{v}_y^2 q^2)$$

represents an artifact of the quadratic range model that couples both range and angle. Also shown in equation [26], $$-2(nI_p + pI_c)\frac{g_0}{|g_0|} \cdot h$$

represents a typical Doppler (indexed by n) as well as phase change during channel time division, the former determined with Doppler filtering and the latter potentially requiring motion compensation. The processing may be denoted with $\Phi_{p,q}$ as shown in equation [27].

$$\Phi_{p,q} = \exp\left[j4\pi f(nI_p + pI_c)\frac{g_0}{|g_0|} \cdot h/c\right] \quad [27]$$

The likelihood including the mocomp stage is shown in equation [28]. Particularly, equation [28] may represent a quadratic matched filter, such as the quadratic matched filters depicted in the above Figures.

$$L(\theta) = \Sigma_{p,q}\Phi_{p,q}\exp[-j\beta_{p,q(\theta)}]$$

The reduced matched filter phase history in the likelihood function above is shown in equation [29].

$$\hat{\rho}_{p,q} = \frac{2\pi f}{c}\left[-\sin(\theta)(\hat{u}_y p + \hat{v}_y q) + \frac{1-\sin^2(\theta)}{2|g_0|}(\hat{u}_y^2 p^2 + \hat{v}_y^2 q^2)\right] \quad [29]$$

The response of the likelihood function over θ for the scenario is produced below for the perfect matched filter (no approximations), the linear matched filter (i.e., an FFT), and this quadratic filter with correspondence between the quadratic approximation and the perfect filter.

For an apodized filter, the critical component of the phase history above may be the term introduced by the quadratic range model. Apodization is an optical filtering technique that can involve changing the shape of a radar signal. For instance, the receive channels (indexed by q) may outnumber transmit channels (indexed by p). If the receive channels' phase are kept linear with respect to sin (θ) then the filter might be implemented as a linear combination of n-p FFTs. To achieve this, some θ nearby the unknown parameter θ and create the following matched filter phase history as shown in equation [30].

$$\hat{\rho}_{p,q,\hat{\theta}} = \frac{2\pi f}{c}\left[-\sin(\theta)(\hat{u}_y p + \hat{v}_y q) + \frac{1-\sin^2(\theta)}{2|g_0|}\hat{v}_y^2 q^2 + \frac{1-\sin^2(\theta)}{2|g_0|}\hat{u}_y^2 p^2\right] \quad [30]$$

Inserting the above approximate phase history into the likelihood (now parameterized by $\hat{\theta}$) and collect terms to produce equation [31].

$$L(\theta) = \sum_p \left[ \sum_q s_{p,q} \Phi_{p,q} \exp\left[ -j\frac{2\pi f}{c} \left[ -\sin(\theta)(\hat{v}_y q) + \frac{1-\sin^2(\hat{\theta})}{2|g_0|}\hat{v}_y^2 q^2 \right] \right] \right] \times \exp\left[ -j\frac{2\pi f}{c}\left[ -\sin(\theta)(\hat{u}_y p) + \frac{1-\sin^2(\hat{\theta})}{2|g_0|}\hat{u}_y^2 p^2 \right] \right] \quad [31]$$

As shown, the likelihood may have an inner and outer sum. The inner stage can represent coarse filtering and is linear admitting an FFT. The outer stage can represent fine filtering and is nonlinear, but only includes n-p terms so it can be efficiently implemented as a sum. Because the likelihood may be conditioned on $\hat{\theta}$ in light of the fact that $\theta$ is unknown. In practice, if equation [31] is used to apodize the likelihood for $\hat{\theta} \in \{-45°, 0°, 45°\}$ to come within proximately 1.5 dB of ideal performance (or another particular range). With this strategy, the likelihood may be represented in equation [32].

$$L(\theta) = \max_{\hat{\theta} \in \{-45°,0°,45°\}} \left| \sum_p \left[ \sum_q s_{p,q} \Phi_{p,q} \exp\left[ -j\frac{2\pi f}{c}\left[ -\sin(\theta)(\hat{v}_y q) + \frac{1-\sin^2(\hat{\theta})}{2|g_0|}\hat{v}_y^2 q^2 \right] \right] \right] \times \exp\left[ -j\frac{2\pi f}{c}\left[ -\sin(\theta)(\hat{u}_y p) + \frac{1-\sin^2(\hat{\theta})}{2|g_0|}\hat{u}_y^2 p^2 \right] \right] \right| \quad [32]$$

The reference signal of the likelihood function is a bit convoluted, so the following breaks down its construction. First, the likelihood can be constructed separately for each range $g_0$. For each $\hat{\theta}$ (3) and receive channel (15), coarse weights are used as shown in equation [33].

$$c_{\hat{\theta},q} = \exp\left[ -j\frac{2\pi f(1-\sin^2(\hat{\theta})\hat{v}_y^2)}{2c|g_0|} q^2 \right] \quad [33]$$

For each angle and transmit channel, fine weights may be represented by equation [34].

$$d_{\hat{\theta},p} = \exp\left[ -j\frac{2\pi f}{c}\left[ -\sin(\theta)(\hat{u}_y p) + \frac{1-\sin^2(\hat{\theta})}{2|g_0|}\hat{u}_y^2 p^2 \right] \right] \quad [34]$$

Accordingly, the likelihood can be adjusted as represented in equation [35].

$$L(\theta) = \max_{\hat{\theta} \in \{-45°,0°,45°\}} \left| \sum_p d_{\hat{\theta},p} \left[ \sum_q s_{p,q} \Phi_{p,q} c_{\hat{\theta},q} \exp\left[ j\frac{2\pi f \hat{v}_y}{c} \sin(\theta) q \right] \right] \right| \quad [35]$$

The array may be structured so that $$\hat{v}_y = \frac{\lambda}{2}$$

such that the likelihood reduces to equation [36].

$$L(\theta) = \max_{\hat{\theta} \in \{-45°,0°,45°\}} |\Sigma_p d_{\hat{\theta},p}[\Sigma_q s_{p,q}\Phi_{p,q}c_{\hat{\theta},q} \exp[j\pi \sin(\theta)q]]| \quad [36]$$

For every $\hat{\theta}$, coarse weights to the data (i.e., $s_{p,q} \Phi_{p,q} c_{\hat{\theta},q}$) can be applied and for each value of p (4), zero pad to samples and take an FFT (or DFT). This will sample $$\frac{\sin(\theta)}{2}$$

at variable points (noting undesirable spectrum wrap). Denoting this result $$\alpha_{\frac{\sin(\theta)}{2}_{p,\hat{\theta}}}$$

produces equation [37].

$$\alpha_{\sin(\theta)/2_p,\hat{\theta}} = \Sigma_q s_{p,q} \Phi_{p,q} c_{\hat{\theta},q} \exp[j\pi \sin(\theta)q] \quad [37]$$

As such, the likelihood can be expressed as shown in equation [38]. Particularly, equation [38] may represent an apodized filter.

$$L(\theta) = \max_{\hat{\theta} \in \{-45°,0°,45°\}} |\Sigma_p d_{\hat{\theta},p} \alpha_{\sin(\theta)/2_p,\hat{\theta}}| \quad [38]$$

Figure 8F:
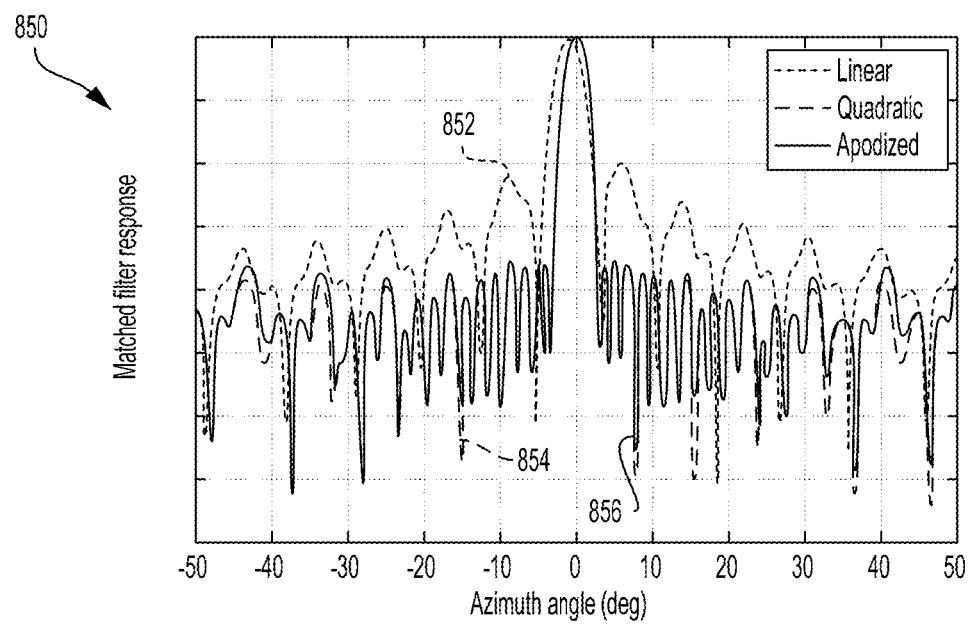
FIG. 8F illustrates a graph depicting matched filter response versus azimuth angle, according to example embodiments.

Near range can be the most challenging for all of the filters. Both the quadratic filter and apodized filter may produce desirable results at near range. The linear filter, however, may produce less desirable results at antenna boresight at near range as shown in graph 850 illustrated in FIG. 8F. Particularly, graph 850 shows matched filter response (e.g., matched filter response in dB) versus azimuth angle (e.g., azimuth angle in degrees) and further includes information corresponding to linear filter 852, quadratic filter 854, and apodized filter 856.

Figure 8G:
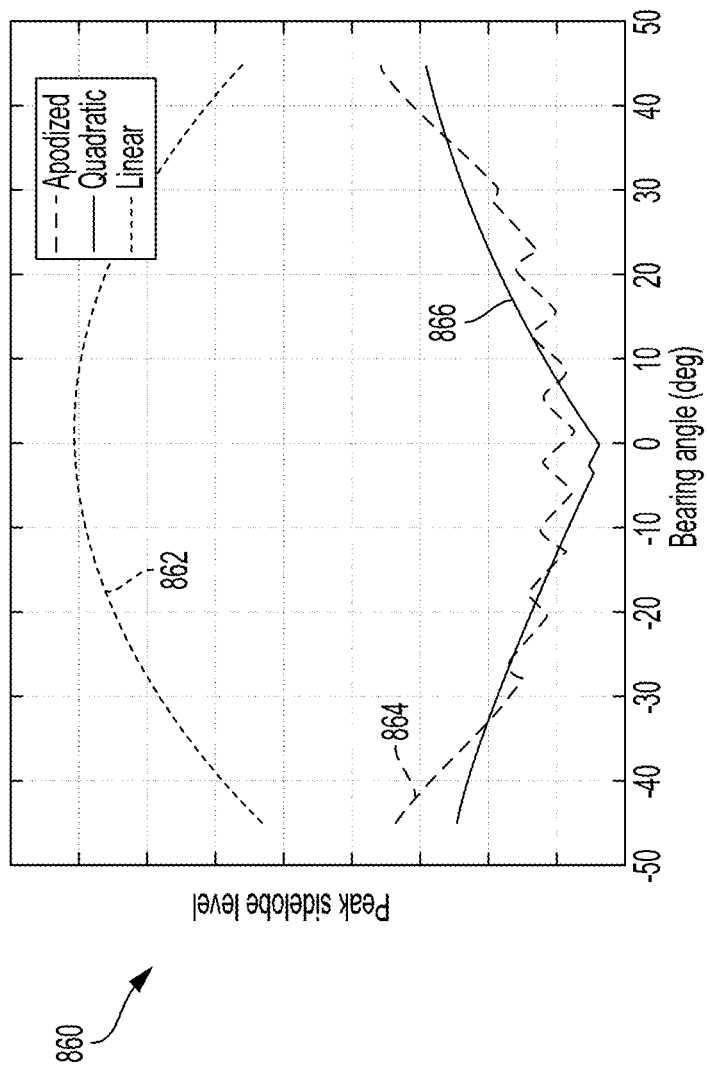
FIG. 8G illustrates a graph depicting performance of various filters, according to example embodiments.

By sweeping the scatterer over azimuth angles holding range constant results in the sidelobe levels as shown in graph 860 illustrated in FIG. 8G. Graph 860 shows that quadratic filter 866 and apodized filter 864 may perform comparably and preferably over the performance of linear filter 862. Further, at longer ranges, apodized filter 864 may performs about as well as quadratic filter 866. In addition, for example, linear filter 862 may start to degrade at less than 20 meters of range. Beyond 20 meters of range, linear filter 862 can be used. Other ranges may be used.

Figure 9:
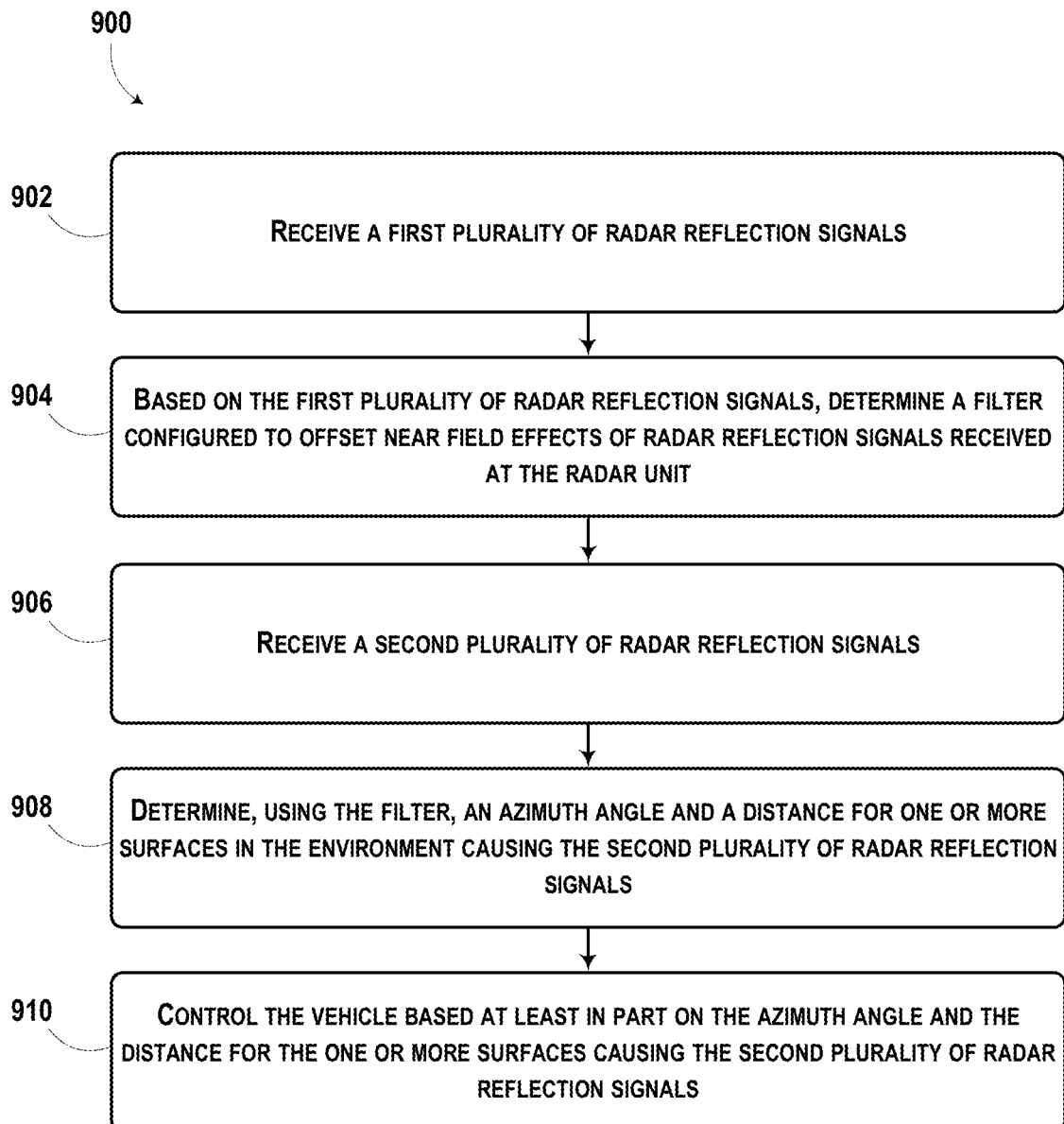
FIG. 9 is a flowchart of a method, according to example embodiments.

FIG. 9 is a flowchart of example method 900 for enhancing near-field measurements performed using one or multiple arrays of a radar unit. Method 900 represents an example method that may include one or more operations, functions, or actions, as depicted by one or more of blocks 902, 904, 906, 908, and 910, each of which may be carried out by any of the systems shown in prior figures, among other possible systems.

Those skilled in the art will understand that the flow chart described herein illustrate functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art. In examples, a computing system may cause a radar system to perform one or more blocks of method 900.

At block 902, method 900 includes receiving a first plurality of radar reflection signals. Radar unit 600 depicted in FIG. 6 or another type of radar unit may receive radar reflection signals that correspond to radar signals that reflected off one or more surfaces in an environment. The receiving radar unit may be part of a radar system (e.g., a vehicle radar system) and may receive the radar reflection signals using one or multiple antennas (e.g., one or multiple reception antenna arrays).

At block 904, method 900 includes determining a filter configured to offset near-field effects of radar reflection signals received at the radar unit based on the first plurality of radar reflection signals. A filter may be determined using calculations, such as the calculations represented by graphs illustrated in FIGS. 8A-8G. Parameters of the filter (e.g., weights of the filter) may depend on azimuth angles and distances for one or more surfaces in the environment causing the radar reflection signals received at the radar unit. These surfaces reflecting radar signals back towards the radar unit(s) can include objects and surfaces in the environment, such as objects and surfaces positioned nearby the radar unit (i.e., in the near-field of the radar unit).

The near-field for a radar unit can depend on various factors, such as the position of the radar unit, power supplied to the radar unit, the size, configuration, and number of transmission and reception arrays, and desired use for the radar unit, among other potential factors. In some examples, the near-field for a radar unit may represent an area extending up to 20 meters from the radar unit. Alternatively, in other examples, the near-field for a radar unit may represent an area extending up to a different distance from the radar unit (e.g., up to 5 meters from the radar unit).

In some examples, determining a filter configured to offset near-field effects of radar reflections signals may involve determining filter parameters that compensates for respective curvature of radar reflection signals received at the radar unit. After radar signals reflect off surfaces in the environment, the radar reflection signals may increase in curvature as they approach the radar unit due to the path of travel of the radar reflection signals as well as on other factors (e.g., the spacing and quantity of antennas within a reception array). This curvature can decrease the accuracy of near-field measurements relative to the radar unit (e.g., an area within 5 meters of the radar unit). As a result, a determined filter may include parameters that factor and compensate for the curvature in radar reflection signals to enhance the near-field measurements accuracy.

In some examples, the filter determined to offset near-field effects of radar reflection signals may be a quadratic matched filter. For example, a quadratic matched filter may resemble the quadratic matched filter represented in equation [28] above. In other examples, the quadratic matched filter may differ and depend on particular near-field effects that the filter was generated to offset (or reduce). In additional examples, the filter may be determined to perform as an apodized filter, such as the apodized filter represented in equation [38]. Other apodized filters configured to enhance near-field measurements performed by a radar unit may be used as well.

At block 906, method 900 includes receiving a second plurality of radar reflection signals. Similar to block 902, the radar unit may receive subsequent radar reflection signals that correspond to subsequent reflections of radar signals that reflected off one or more surfaces (e.g., objects, road elements, other features) in the environment. The radar reflection signals may be received by one or more arrays of reception antennas.

At block 908, method 900 includes determining, using the filter, an azimuth angle and a distance for one or more surfaces in the environment causing the second plurality of radar reflection signals. Particularly, when processing radar reflection signals (or sets of radar reflection signals) of the second plurality of radar reflection signals, the filter may be used to remove (or reduce) undesired effects that impact near-field measurements. The filter can reduce or remove unwanted effects that can occur due to the curvature of radar reflection signals that are received in the near field of one or multiple reception antenna arrays of the radar unit.

In some examples, parameters (i.e., weights) of the filter can offset effects that reduce the accuracy of near-field measurements. As a result, these parameters can be adjusted to further reduce or offset the effects that impact the accuracy of the near-field measurements.

At block 910, method 900 includes controlling the vehicle based at least in part on the azimuth angle and the distance for the one or more surfaces causing the second plurality of radar reflection signals. For instance, a vehicle control system may use the information (e.g., azimuth angle, distance, elevation angle) to determine positions and orientations of objects in the environment relative to the vehicle when formulating control strategy in the area. In addition, the vehicle control system may also use the information to determine if objects are moving towards or away from the vehicle as well as the rate of change in positions of one or more objects. For instance, the vehicle control system may monitor and adjust operation based on the movement of nearby vehicles and pedestrians detected using radar.

In some examples, method 900 may further involve transmitting, at the radar unit coupled to the vehicle in the environment, a plurality of radar signals. In particular, the radar unit may be configured to transmit radar signals that reflect off surfaces in the environment and back towards the radar unit. For instance, the radar unit may use one or multiple transmission arrays to transmit the radar signals as instructed into the environment (e.g., towards a particular region). Upon arriving at the radar unit, one or multiple reception arrays may receive the radar reflection signals, which is in response to the radar unit transmitting the radar signals initially. In further examples, transmitting radar signals by the radar unit may involve transmitting linear frequency modulated radar signals.

As discussed above, the radar unit may be part of a vehicle radar system. As such, the vehicle radar system may include multiple radar units coupled to the vehicle such that the vehicle radar system is configured to operate over a 360-degree azimuth plane around the vehicle. In some instances, the vehicle radar system may be configured to capture measurements of particular areas around the vehicle. For instance, the vehicle radar system may capture measurements of the environment in the near-field (e.g., 20 meters or less) and medium field (e.g., 20 meters to 50 meters) of the vehicle. In other examples, the vehicle radar system may capture measurements of a far field (e.g., 50 meters or greater) in addition to closer fields relative to a position and an orientation of the vehicle in the environment.

In some examples, method 900 may further involve transmitting the filter to one or more systems of other vehicles. For instance, the filter may be provided to another vehicle that includes a radar unit having the same structure, orientation, and position as the radar unit used to determine the filter. As a result, the other vehicle may use the filter when processing radar reflection signals received at the radar unit to reduce unwanted effects that can arise during processing near-field measurements.

In another example, method 900 may also involve storing the filter in memory for subsequent use. For example, a system may store the filter in memory prior to powering off the radar system (e.g., when powering off the vehicle in general). As such, the system may access the filter in memory and subsequently use the filter to process near-field measurements of radar reflection signals when operating the radar system.

In further examples, the filter may be determined such that the filter prioritize offsetting some undesirable effects more than others when processing radar measurements of the near-field of the radar unit. For instance, the filter may assign a higher weight to offsetting undesirable effects caused by the curvature of received radar reflection signals than the weight assigned to offset undesirable effects caused by the proximity of antennas within the reception antenna array. In addition, the weights assigned to reducing or offsetting the undesirable effects caused by sources can be modified and updated. For instance, a system may perform an iterative process to refine weight assignments used by the filter to maintain accurate near-field results.

In some examples, method 900 may further involve receiving, at a second radar unit coupled to the vehicle, a third plurality of radar reflection signals. Based on the third plurality of radar reflection signals, method 900 may further involve determining a second filter configured to offset near-field effects of radar reflection signals received at the second radar unit. In particular, the second filter may depend on an azimuth angle and a distance for one or more surfaces in the environment causing the third plurality of radar reflection signals.

Method 900 may further involve receiving, at the second radar unit, a fourth plurality of radar reflection signals and determining, using the second filter, an azimuth angle and a distance for one or more surfaces in the environment causing the fourth plurality of radar reflection signals. As such, controlling the vehicle based at least in part on the azimuth angle and the distance for the one or more surfaces causing the second plurality of radar reflection signals may be further based at least in part on the azimuth angle and the distance for the one or more surfaces causing the fourth plurality of radar reflection signals. As shown, multiple filters can be determined for different radar units that are part of the vehicle radar system. The multiple filters can enable the vehicle radar system to determine accurate measurements of the near-field surrounding the vehicle (i.e., extending 360 degrees around the vehicle).

In some examples, method 900 may further involve receiving, at the radar unit, a fifth plurality of radar reflection signals. Particularly, based on the fifth plurality of radar reflection signals, method 900 may also involve modifying the filter configured to offset near-field effects of radar reflection signals received at the radar unit. For example, modifying the filter may be based on an azimuth angle and a distance for one or more surfaces in the environment causing the fifth plurality of radar reflection signals. As such, the system may perform a calibration process that adjusts the filter periodically to ensure that near-field measurements determined using radar reflection signals received at one or more reflection antenna arrays are accurate.

Figure 10:
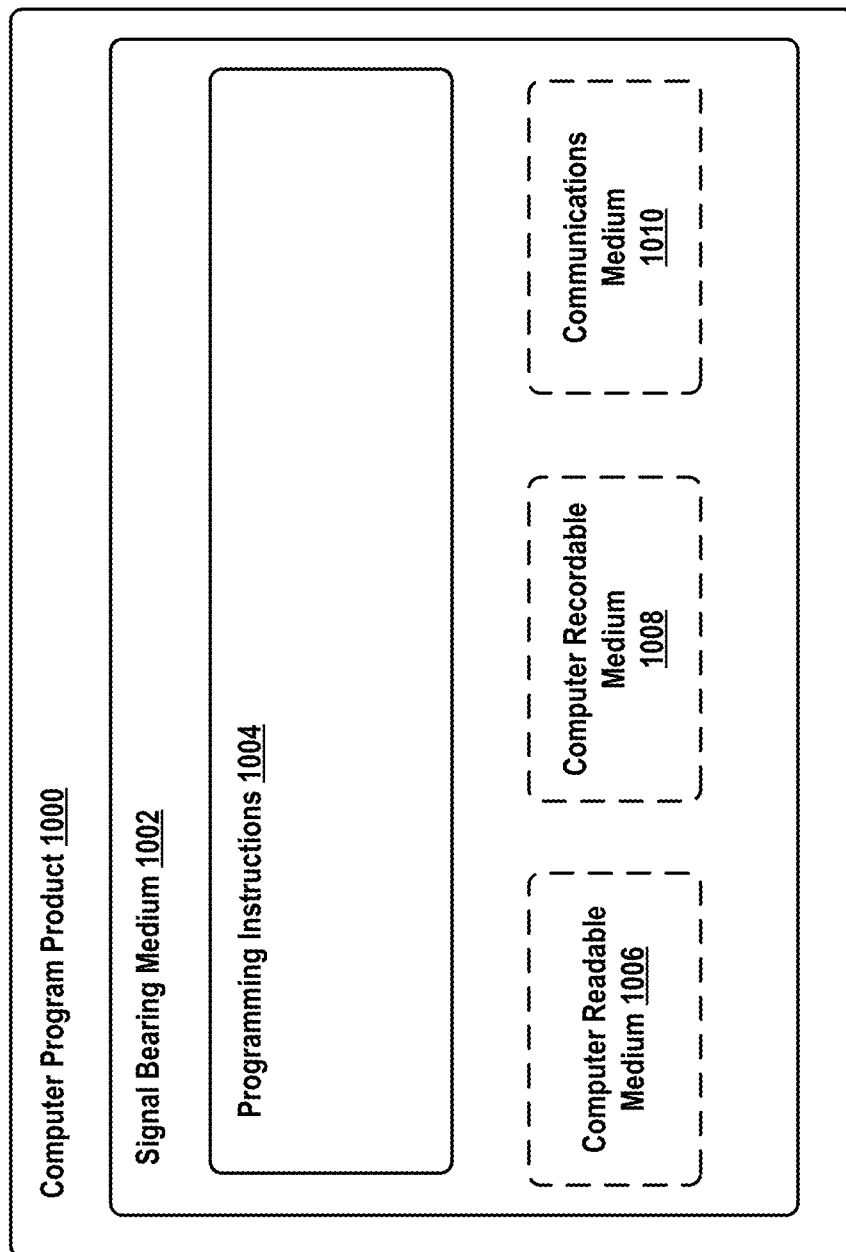
FIG. 10 illustrates a schematic diagram of a computer program, according to example embodiments.

FIG. 10 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 1000 is provided using signal bearing medium 1002, which may include one or more programming instructions 1004 that, when executed by one or more processors may provide functionality or portions of the functionality described above with respect to FIGS. 1-9. In some examples, the signal bearing medium 1002 may encompass a non-transitory computer-readable medium 1006, such as, but not limited to, a hard disk drive, a Compact Disc (CD), a Digital Video Disk (DVD), a digital tape, memory, etc. In some implementations, the signal bearing medium 1002 may encompass a computer recordable medium 1008, such as, but not limited to, memory, read/write (R/W) CDs, R/W DVDs, etc. In some implementations, the signal bearing medium 1002 may encompass a communications medium 1010, such as, but not limited to, a digital and/or an analog communication medium (e.g., a fiber optic cable, a waveguide, a wired communications link, a wireless communication link, etc.). Thus, for example, the signal bearing medium 1002 may be conveyed by a wireless form of the communications medium 1010.

The one or more programming instructions 1004 may be, for example, computer executable and/or logic implemented instructions. In some examples, a computing device such as the computer system 112 of FIG. 1 may be configured to provide various operations, functions, or actions in response to the programming instructions 1004 conveyed to the computer system 112 by one or more of the computer readable medium 1006, the computer recordable medium 1008, and/or the communications medium 1010.

The non-transitory computer readable medium could also be distributed among multiple data storage elements, which could be remotely located from each other. The computing device that executes some or all of the stored instructions could be a vehicle, such as vehicle 200 illustrated in FIG. 2, among other possibilities. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method comprising:
transmitting, by a radar unit coupled to a vehicle, a plurality of radar signals into an environment of the vehicle as the vehicle navigates a path in the environment;
receiving, at the radar unit, a plurality of radar reflection signals corresponding to the plurality of radar signals;
detecting, based on the plurality of radar reflection signals, a degree of curvature of radar reflection signals corresponding to near-field measurements of the environment;
based on detecting the degree of curvature of the radar reflection signals corresponding to near-field measurements, generating, by a computing system coupled to the vehicle, a filter configured to offset near-field effects of radar reflection signals received at the radar unit as the vehicle navigates the path in the environment, wherein one or more parameters of the filter compensate for the degree of curvature of the radar reflections corresponding to near-field measurements and depends on an azimuth angle and a distance for one or more surfaces in the environment that caused the radar reflection signals corresponding to near-field measurements; and
storing the filter in memory prior to powering off the radar unit, wherein the computing system is configured to access the filter in memory and subsequently use the filter to process near-field measurements of radar reflection signals received by the radar unit.

2. The method of claim 1, further comprising:
receiving, at the radar unit, a second plurality of radar reflection signals; and
detecting, using the filter, one or more objects in the environment.

3. The method of claim 2, wherein detecting the one or more objects in the environment further comprises:
determining, using the filter, an azimuth angle and a distance for one or more objects in the environment.

4. The method of claim 3, further comprising:
controlling the vehicle based at least in part on the azimuth angle and the distance for the one or more objects in the environment.

5. The method of claim 1, wherein receiving the plurality of radar reflection signals comprises:
receiving the plurality of radar reflection signals using an antenna array of the radar unit.

6. The method of claim 1, wherein the one or more surfaces that caused the plurality of radar reflection signals correspond to an object positioned in a near-field of the radar unit, and
wherein the near-field of the radar unit is within 20 meters of the radar unit.

7. The method of claim 1, wherein generating the filter configured to offset near-field effects of radar reflection signals received at the radar unit comprises:
generating the filter as a quadratic matched filter.

8. The method of claim 1, wherein generating the filter configured to offset near-field effects of radar reflection signals received at the radar unit comprises:
generating the filter based on an apodized filter.

9. The method of claim 1, wherein transmitting the plurality of radar signals comprises:
transmitting linear frequency modulated radar signals.

10. The method of claim 1, wherein generating the filter configured to offset near-field effects of radar reflection signals received at the radar unit further comprises:
generating the filter further based on a position and orientation of an antenna array used by the radar.

11. The method of claim 10, wherein generating the filter further based on the position and orientation of the antenna array used by the radar comprises:
generating the filter further based on respective spacing between antenna elements in the antenna array used by the radar.

12. A radar system comprising:
a radar unit coupled to a vehicle and configured to:
transmit a plurality of radar signals into an environment of the vehicle as the vehicle navigates a path in the environment; and
receive a plurality of radar reflection signals corresponding to the plurality of radar signals; and
a computing device coupled to the vehicle and configured to:
detect, based on the plurality of radar reflection signals, a degree of curvature of radar reflection signals corresponding to near-field measurements of the environment;
based on detecting the degree of curvature of the radar reflection signals corresponding to near-field measurements, generate a filter configured to offset near-field effects of radar reflection signals received at the radar unit as the vehicle navigates the path in the environment, wherein one or more parameters of the filter compensate for the degree of curvature of the radar reflections corresponding to near-field measurements and depends on an azimuth angle and a distance for one or more surfaces in the environment that caused the radar reflection signals corresponding to near-field measurements; and
store the filter in memory prior to powering off the radar unit, wherein the computing device is configured to access the filter in memory and subsequently user the filter to process near-field measurements of radar reflection signals received by the radar unit.

13. The radar system of claim 12, wherein the vehicle includes a plurality of radar units configured to operate over a 360-degree azimuth plane around the vehicle.

14. The radar system of claim 12, wherein the computing device is further configured to generate the filter based on a quadratic matched filter.

15. The radar system of claim 12, wherein the computing device is further configured to generate the filter based on an apodized filter.

16. A non-transitory computer-readable medium configured to store instructions, that when executed by a computing system comprising one or more processors, causes the computing system to perform operations comprising:
causing a radar unit to transmit a plurality of radar signals into an environment of a vehicle as the vehicle navigates a path in the environment;
obtaining, from the radar unit, a plurality of radar reflection signals corresponding to the plurality of radar signals;
detecting, based on the plurality of radar reflection signals, a degree of curvature of radar reflection signals corresponding to near-field measurements of the environment;

based on detecting the degree of curvature of the radar reflection signals corresponding to near-field measurements, generating a filter configured to offset near-field effects of radar reflection signals received at the radar unit as the vehicle navigates the path in the environment, wherein one or more parameters of the filter compensate for the degree of curvature of the radar reflections corresponding to near-field measurements and depends on an azimuth angle and a distance for one or more surfaces in the environment that caused the plurality of radar reflection signals;

storing the filter in memory prior to powering off the radar unit, wherein the computing system is configured to access the filter in memory and subsequently use the filter to process near-field measurements of radar reflection signals received by the radar unit.

17. The non-transitory computer-readable medium of claim 16, further comprising:

obtaining, from the radar unit, a second plurality of radar reflection signals; and detecting, using the filter, one or more objects in the environment.

18. The non-transitory computer-readable medium of claim 17, wherein detecting the one or more objects in the environment further comprises:

determining, using the filter, an azimuth angle and a distance for one or more objects in the environment.

19. The non-transitory computer-readable medium of claim 18, further comprising:

controlling the vehicle based at least in part on the azimuth angle and the distance for the one or more objects in the environment, wherein the radar unit is coupled to the vehicle.

20. The non-transitory computer-readable medium of claim 16, further comprising:

obtaining, from the radar unit, a subsequent plurality of radar reflection signals; and updating the filter based on the subsequent plurality of radar reflection signals.

* * * * *